(12) United States Patent
Kitahara

(10) Patent No.: US 7,483,221 B2
(45) Date of Patent: Jan. 27, 2009

(54) IMAGE READING LENS, IMAGE OPTICAL SYSTEM AND IMAGE READER

(75) Inventor: Yu Kitahara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 19 days.

(21) Appl. No.: 11/826,931

(22) Filed: Jul. 19, 2007

(65) Prior Publication Data

US 2008/0019014 A1 Jan. 24, 2008

(30) Foreign Application Priority Data

Jul. 21, 2006 (JP) .................... P2006-199077

(51) Int. Cl.
*G02B 9/62* (2006.01)
*G02B 15/02* (2006.01)

(52) U.S. Cl. .............. 359/760; 359/756; 359/757; 359/759; 359/672

(58) Field of Classification Search ............. 359/672, 359/673, 675, 756, 759, 760

See application file for complete search history.

(56) References Cited

U.S. PATENT DOCUMENTS 5,930,056 A * 7/1999 Ohashi ................... 359/776
6,101,049 A * 8/2000 Noda ..................... 359/760
6,366,412 B1 * 4/2002 Noda et al. ................ 359/760
6,665,131 B2 * 12/2003 Suzuki et al. ............... 359/778

FOREIGN PATENT DOCUMENTS

JP 2002-148514 A 5/2002
JP 2002-287022 A 10/2002

* cited by examiner

*Primary Examiner*—David N Spector
(74) *Attorney, Agent, or Firm*—Birch, Stewart, Kolasch & Birch, LLP

(57) ABSTRACT

An image reading lens is provided and includes: first, second and third lens groups arranged on the object side with respect to the aperture stop; and fourth, fifth and sixth lens groups arranged on the image side. At least all positive lenses, in each lens group, satisfy conditional expression (1) below. At least two positive lenses of the first to third lens groups and at least two positive lens of the fourth to sixth lens groups satisfy the conditional expression (2) below. In the conditional expressions, νd represents Abbe number at the d-line, and $\Delta\theta_{g,d}$ represents abnormal dispersion.

$$\nu d > 60.0 \quad (1)$$

$$\Delta\theta_{g,d} > 0.015 \quad (2)$$

21 Claims, 31 Drawing Sheets

EXAMPLE 1

EXAMPLE 1

EXAMPLE 2

EXAMPLE 3

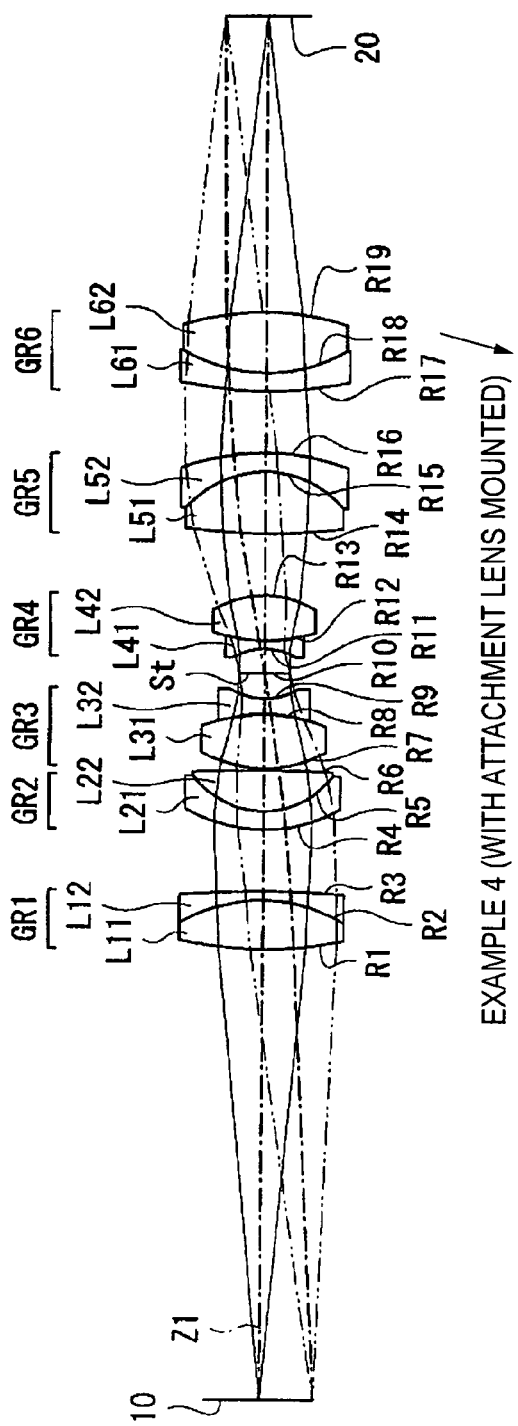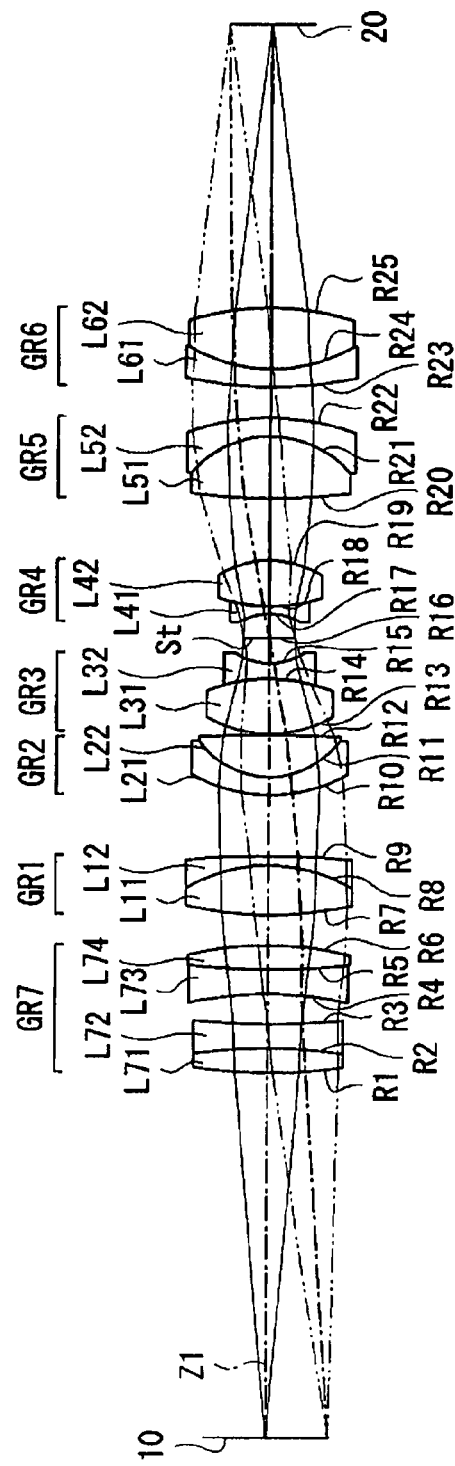
FIG. 4A  EXAMPLE 4
FIG. 4B  EXAMPLE 4 (WITH ATTACHMENT LENS MOUNTED)

EXAMPLE 5

EXAMPLE 5 (WITH ATTACHMENT LENS MOUNTED)

EXAMPLE 6

EXAMPLE 8

FIG. 9

| | EXAMPLE 1: LENS DATA | | | | | | |
|---|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 62.250 | 8.09 | 1.49700 | 81.6 | 1.2318 | 0.0365 |
| | 2 | -501.595 | 0.70 | | | | |
| GR2 | 3 | 55.696 | 3.61 | 1.51680 | 64.2 | 1.2261 | -0.0054 |
| | 4 | 21.130 | 7.19 | 1.56907 | 71.3 | 1.2430 | 0.0263 |
| | 5 | 137.797 | 1.58 | | | | |
| GR3 | 6 | 31.315 | 8.14 | 1.56907 | 71.3 | 1.2430 | 0.0263 |
| | 7 | 1057.651 | 7.06 | 1.74400 | 44.8 | 1.2676 | -0.0043 |
| | 8 | 18.461 | 8.58 | | | | |
| | 9 (STOP) | — | 8.43 | | | | |
| GR4 | 10 | -16.949 | 7.08 | 1.51742 | 52.4 | 1.2551 | -0.0008 |
| | 11 | -81.596 | 7.20 | 1.56907 | 71.3 | 1.2430 | 0.0263 |
| | 12 | -31.740 | 0.65 | | | | |
| GR5 | 13 | -282.958 | 7.30 | 1.56907 | 71.3 | 1.2430 | 0.0263 |
| | 14 | -23.269 | 2.79 | 1.51742 | 52.4 | 1.2551 | -0.0008 |
| | 15 | -47.477 | 0.20 | | | | |
| GR6 | 16 | -1214.402 | 1.86 | 1.51680 | 64.2 | 1.2261 | -0.0054 |
| | 17 | 47.977 | 7.46 | 1.49700 | 81.6 | 1.2318 | 0.0365 |
| | 18 | -70.473 | | | | | |

(FOCAL LENGTH f=94.36mm, MAGNIFICATION β=−0.82)

FIG. 10

| | EXAMPLE 2: LENS DATA | | | | | |
|---|---|---|---|---|---|---|
| Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg, dj (RELATIVE PARTIAL DISPERSION) | Δθg, dj (ABNORMAL DISPERSION) |
| GR1  1 | 95.320 | 6.50 | 1.49700 | 81.6 | 1.2318 | 0.0365 |
| GR1  2 | -59.753 | 2.10 | 1.51680 | 64.2 | 1.2261 | -0.0054 |
| GR1  3 | 210.726 | 4.56 | | | | |
| GR2  4 | 45.910 | 6.94 | 1.59240 | 68.3 | 1.2430 | 0.0201 |
| GR2  5 | 353.604 | 2.57 | | | | |
| GR3  6 | 32.775 | 7.58 | 1.59240 | 68.3 | 1.2430 | 0.0201 |
| GR3  7 | -80.056 | 7.14 | 1.57099 | 50.8 | 1.2587 | -0.0006 |
| GR3  8 | 17.578 | 9.34 | | | | |
| 9 (STOP) | — | 8.20 | | | | |
| GR4  10 | -19.539 | 7.63 | 1.54072 | 47.2 | 1.2661 | -0.0007 |
| GR4  11 | -66.310 | 7.80 | 1.59240 | 68.3 | 1.2430 | 0.0201 |
| GR4  12 | -35.441 | 0.20 | | | | |
| GR5  13 | -199.825 | 7.40 | 1.59240 | 68.3 | 1.2430 | 0.0201 |
| GR5  14 | -22.178 | 4.61 | 1.51742 | 52.4 | 1.2551 | -0.0008 |
| GR5  15 | -53.000 | 0.45 | | | | |
| GR6  16 | -1207.994 | 2.53 | 1.51680 | 64.2 | 1.2261 | -0.0054 |
| GR6  17 | 45.426 | 7.08 | 1.49700 | 81.6 | 1.2318 | 0.0365 |
| GR6  18 | -89.021 | | | | | |

(FOCAL LENGTH f=92.10mm, MAGNIFICATION β=-0.77)

FIG. 11

| | EXAMPLE 3: LENS DATA | | | | | | |
|---|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 74.061 | 16.50 | 1.43875 | 95.0 | 1.2274 | 0.0600 |
| | 2 | -59.270 | 3.50 | 1.51633 | 64.1 | 1.2278 | -0.0038 |
| | 3 | -202.358 | 20.00 | | | | |
| GR2 | 4 | 66.687 | 4.04 | 1.48749 | 70.2 | 1.2209 | 0.0019 |
| | 5 | 26.877 | 13.30 | 1.59240 | 68.3 | 1.2430 | 0.0201 |
| | 6 | 338.067 | 0.20 | | | | |
| GR3 | 7 | 36.999 | 14.50 | 1.61800 | 63.4 | 1.2430 | 0.0072 |
| | 8 | -150.297 | 4.91 | 1.81600 | 46.6 | 1.2568 | -0.0113 |
| | 9 | 23.603 | 8.00 | | | | |
| | 10 (STOP) | — | 8.01 | | | | |
| GR4 | 11 | -20.685 | 2.50 | 1.83481 | 42.7 | 1.2658 | -0.0104 |
| | 12 | -61.966 | 14.99 | 1.61800 | 63.4 | 1.2403 | 0.0072 |
| | 13 | -30.931 | 20.00 | | | | |
| GR5 | 14 | 309.253 | 20.00 | 1.59240 | 68.3 | 1.2430 | 0.0201 |
| | 15 | -39.330 | 6.00 | 1.51633 | 64.1 | 1.2278 | -0.0038 |
| | 16 | -82.729 | 20.00 | | | | |
| GR6 | 17 | 157.459 | 5.70 | 1.51633 | 64.1 | 1.2278 | -0.0038 |
| | 18 | 47.244 | 20.00 | 1.43875 | 95.0 | 1.2274 | 0.0600 |
| | 19 | -122.373 | | | | | |

(FOCAL LENGTH f=271.59mm, MAGNIFICATION β=-0.85)

FIG. 12

| | EXAMPLE 4: LENS DATA | | | | | |
|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 126.043 | 16.00 | 1.43875 | 95.0 | 1.2274 | 0.0600 |
| | 2 | -52.906 | 3.00 | 1.51633 | 64.1 | 1.2278 | -0.0039 |
| | 3 | -325.902 | 20.00 | | | | |
| GR2 | 4 | 51.104 | 6.00 | 1.53996 | 59.5 | 1.2400 | -0.0012 |
| | 5 | 28.617 | 13.60 | 1.59240 | 68.3 | 1.2430 | 0.0201 |
| | 6 | -504.666 | 0.50 | | | | |
| GR3 | 7 | 42.180 | 17.72 | 1.61800 | 63.4 | 1.2430 | 0.0072 |
| | 8 | -55.304 | 5.00 | 1.77250 | 49.6 | 1.2502 | -0.0116 |
| | 9 | 22.160 | 8.00 | | | | |
| | 10 (STOP) | — | 8.00 | | | | |
| GR4 | 11 | -21.579 | 2.50 | 1.81600 | 46.6 | 1.2568 | -0.0113 |
| | 12 | 52.346 | 15.00 | 1.61800 | 63.4 | 1.2403 | 0.0072 |
| | 13 | -31.911 | 20.00 | | | | |
| GR5 | 14 | 207.781 | 20.00 | 1.59240 | 68.3 | 1.2430 | 0.0201 |
| | 15 | -34.701 | 6.00 | 1.56384 | 60.7 | 1.2349 | -0.0038 |
| | 16 | -79.512 | 20.00 | | | | |
| GR6 | 17 | 132.602 | 6.00 | 1.71300 | 53.9 | 1.2421 | -0.0108 |
| | 18 | 52.614 | 20.00 | 1.43875 | 95.0 | 1.2274 | 0.0600 |
| | 19 | -89.497 | | | | | |

(FOCAL LENGTH f=242.40mm, MAGNIFICATION β=-0.78)

FIG. 13

| | EXAMPLE 4: LENS DATA (WITH ATTACHMENT LENS MOUNTED) | | | | | |
|---|---|---|---|---|---|---|
| Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| 1 | 175.819 | 8.00 | 1.51680 | 64.2 | 1.2261 | -0.0054 |
| 2 | -167.615 | 8.00 | 1.81600 | 46.6 | 1.2568 | -0.0113 |
| 3 | 265.160 | 10.00 | | | | |
| 4 | -120.916 | 8.00 | 1.51680 | 64.2 | 1.2261 | -0.0054 |
| 5 | 219.761 | 8.00 | 1.53172 | 48.9 | 1.2635 | 0.0002 |
| 6 | -107.948 | 10.00 | | | | |
| 7 | 126.043 | 16.00 | 1.43875 | 95.0 | 1.2274 | 0.0600 |
| 8 | -52.906 | 3.00 | 1.51633 | 64.1 | 1.2278 | -0.0039 |
| 9 | -325.902 | 20.00 | | | | |
| 10 | 51.104 | 6.00 | 1.53996 | 59.5 | 1.2400 | -0.0012 |
| 11 | 28.617 | 13.60 | 1.59240 | 68.3 | 1.2430 | 0.0201 |
| 12 | -504.666 | 0.50 | | | | |
| 13 | 42.180 | 17.72 | 1.61800 | 63.4 | 1.2430 | 0.0072 |
| 14 | -55.304 | 5.00 | 1.77250 | 49.6 | 1.2502 | -0.0116 |
| 15 | 22.160 | 8.00 | | | | |
| 16 (STOP) | — | 8.00 | | | | |
| 17 | -21.579 | 2.50 | 1.81600 | 46.6 | 1.2568 | -0.0113 |
| 18 | 52.346 | 15.00 | 1.61800 | 63.4 | 1.2403 | 0.0072 |
| 19 | -31.911 | 20.00 | | | | |
| 20 | 207.781 | 20.00 | 1.59240 | 68.3 | 1.2430 | 0.0201 |
| 21 | -34.701 | 6.00 | 1.56384 | 60.7 | 1.2349 | -0.0038 |
| 22 | -79.512 | 10.02 | | | | |
| 23 | 132.602 | 6.00 | 1.71300 | 53.9 | 1.2421 | -0.0108 |
| 24 | 52.614 | 20.00 | 1.43875 | 95.0 | 1.2274 | 0.0600 |
| 25 | -89.497 | | | | | |

Group assignments: GR7 (1–6), GR1 (7–9), GR2 (10–12), GR3 (13–15), GR4 (17–19), GR5 (20–22), GR6 (23–25)

(FOCAL LENGTH f=189.85mm, MAGNIFICATION β=−0.69)

FIG. 14

| | EXAMPLE 5: LENS DATA | | | | | |
|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 157.836 | 16.05 | 1.43875 | 95.0 | 1.2274 | 0.0600 |
| | 2 | -48.266 | 3.50 | 1.51680 | 64.2 | 1.2261 | -0.0054 |
| | 3 | -105.878 | 20.00 | | | | |
| GR2 | 4 | 64.611 | 4.00 | 1.51680 | 64.2 | 1.2261 | -0.0054 |
| | 5 | 34.820 | 13.30 | 1.59240 | 68.3 | 1.2430 | 0.0201 |
| | 6 | -794.491 | 0.20 | | | | |
| GR3 | 7 | 36.954 | 20.00 | 1.59240 | 68.3 | 1.2430 | 0.0201 |
| | 8 | -724.248 | 5.00 | 1.83481 | 42.7 | 1.2658 | -0.0104 |
| | 9 | 21.729 | 9.82 | | | | |
| | 10 (STOP) | — | 8.00 | | | | |
| GR4 | 11 | -21.999 | 2.50 | 1.83481 | 42.7 | 1.2658 | -0.0104 |
| | 12 | 91.669 | 15.00 | 1.59240 | 68.3 | 1.2430 | 0.0201 |
| | 13 | -30.529 | 20.00 | | | | |
| GR5 | 14 | 461.980 | 20.00 | 1.59240 | 68.3 | 1.2430 | 0.0201 |
| | 15 | -37.736 | 6.00 | 1.51680 | 64.2 | 1.2261 | -0.0054 |
| | 16 | -84.862 | 20.00 | | | | |
| GR6 | 17 | 107.762 | 2.50 | 1.51680 | 64.2 | 1.2261 | -0.0054 |
| | 18 | 45.654 | 15.00 | 1.43875 | 95.0 | 1.2274 | 0.0600 |
| | 19 | -144.793 | | | | | |

(FOCAL LENGTH f=392.17mm, MAGNIFICATION β=−0.95)

FIG. 15

| | EXAMPLE 5: LENS DATA (WITH ATTACHMENT LENS MOUNTED) | | | | | | |
|---|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR7 | 1 | -231.251 | 13.35 | 1.53996 | 59.5 | 1.2400 | -0.0012 |
| | 2 | -54.650 | 7.52 | 1.51823 | 59.0 | 1.2419 | -0.0004 |
| | 3 | 247.852 | 15.83 | | | | |
| GR1 | 4 | 157.836 | 16.05 | 1.43875 | 95.0 | 1.2274 | 0.0600 |
| | 5 | -48.266 | 3.50 | 1.51680 | 64.2 | 1.2261 | -0.0054 |
| | 6 | -105.878 | 20.00 | | | | |
| GR2 | 7 | 64.611 | 4.00 | 1.51680 | 64.2 | 1.2261 | -0.0054 |
| | 8 | 34.820 | 13.30 | 1.59240 | 68.3 | 1.2430 | 0.0201 |
| | 9 | -794.491 | 0.20 | | | | |
| GR3 | 10 | 36.954 | 20.00 | 1.59240 | 68.3 | 1.2430 | 0.0201 |
| | 11 | -724.248 | 5.00 | 1.83481 | 42.7 | 1.2658 | -0.0104 |
| | 12 | 21.729 | 9.82 | | | | |
| | 13 (STOP) | — | 8.00 | | | | |
| GR4 | 14 | -21.999 | 2.50 | 1.83481 | 42.7 | 1.2658 | -0.0104 |
| | 15 | 91.669 | 15.00 | 1.59240 | 68.3 | 1.2430 | 0.0201 |
| | 16 | -30.529 | 20.00 | | | | |
| GR5 | 17 | 461.980 | 20.00 | 1.59240 | 68.3 | 1.2430 | 0.0201 |
| | 18 | -37.736 | 6.00 | 1.51680 | 64.2 | 1.2261 | -0.0054 |
| | 19 | -84.862 | 20.00 | | | | |
| GR6 | 20 | 107.762 | 2.50 | 1.51680 | 64.2 | 1.2261 | -0.0054 |
| | 21 | 45.654 | 15.00 | 1.43875 | 95.0 | 1.2274 | 0.0600 |
| | 22 | -144.793 | | | | | |

(FOCAL LENGTH f=408.47mm, MAGNIFICATION β=-1.01)

FIG. 16

| | EXAMPLE 6: LENS DATA | | | | | |
|---|---|---|---|---|---|---|
| Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1  1 | 40.561 | 6.48 | 1.49700 | 81.6 | 1.2318 | 0.0365 |
| GR1  2 | −403.891 | 2.89 | | | | |
| GR2  3 | 64.176 | 6.93 | 1.5924 | 68.3 | 1.2430 | 0.0201 |
| GR2  4 | 101.599 | 2.38 | | | | |
| GR3  5 | 28.437 | 6.10 | 1.59240 | 68.3 | 1.2430 | 0.0201 |
| GR3  6 | −79.399 | 6.99 | 1.77250 | 49.6 | 1.2502 | −0.0116 |
| GR3  7 | 17.559 | 8.05 | | | | |
| 8 (STOP) | — | 8.51 | | | | |
| GR4  9 | −19.031 | 9.02 | 1.54072 | 47.2 | 1.2661 | −0.0007 |
| GR4  10 | −101.877 | 6.20 | 1.59240 | 68.3 | 1.2430 | 0.0201 |
| GR4  11 | −31.253 | 0.56 | | | | |
| GR5  12 | −206.092 | 8.06 | 1.59240 | 68.3 | 1.2430 | 0.0201 |
| GR5  13 | −22.114 | 3.95 | 1.51823 | 59.0 | 1.2419 | −0.0004 |
| GR5  14 | −89.507 | 0.30 | | | | |
| GR6  15 | 472.044 | 2.60 | 1.56384 | 60.7 | 1.2349 | −0.0038 |
| GR6  16 | 53.994 | 8.86 | 1.49700 | 81.6 | 1.2318 | 0.0365 |
| GR6  17 | −60.034 | | | | | |

(FOCAL LENGTH f=99.92mm, MAGNIFICATION β=−0.85)

FIG. 17

| | EXAMPLE 7: LENS DATA | | | | | | |
|---|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 167.733 | 18.00 | 1.43875 | 95.0 | 1.2274 | 0.0600 |
| | 2 | -51.088 | 4.74 | 1.51680 | 64.2 | 1.2261 | -0.0054 |
| | 3 | -121.196 | 20.00 | | | | |
| GR2 | 4 | 92.069 | 6.00 | 1.48749 | 70.2 | 1.2209 | 0.0019 |
| | 5 | 35.902 | 20.00 | 1.59240 | 68.3 | 1.2430 | 0.0201 |
| | 6 | -2552.995 | 20.00 | | | | |
| GR3 | 7 | 41.874 | 20.00 | 1.61800 | 63.4 | 1.2403 | 0.0072 |
| | 8 | -34.748 | 4.98 | 1.83481 | 42.7 | 1.2658 | -0.0104 |
| | 9 | 21.227 | 8.00 | | | | |
| | 10 (STOP) | — | 8.00 | | | | |
| GR4 | 11 | -21.703 | 2.50 | 1.77250 | 49.6 | 1.2502 | -0.0116 |
| | 12 | 103.544 | 8.96 | 1.61800 | 63.4 | 1.2430 | 0.0072 |
| | 13 | -28.504 | 0.20 | | | | |
| GR5 | 14 | -1069.375 | 13.58 | 1.59240 | 68.3 | 1.2430 | 0.0201 |
| | 15 | -23.306 | 5.99 | 1.48749 | 70.2 | 1.2209 | 0.0019 |
| | 16 | -61.312 | 0.25 | | | | |
| GR6 | 17 | 203.200 | 3.00 | 1.51680 | 64.2 | 1.2261 | -0.0054 |
| | 18 | 44.594 | 17.44 | 1.43875 | 95.0 | 1.2274 | 0.0600 |
| | 19 | -54.770 | | | | | |

(FOCAL LENGTH f=240.28mm, MAGNIFICATION β=-0.93)

FIG. 18

| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
|---|---|---|---|---|---|---|---|
| | \multicolumn{7}{c}{EXAMPLE 7: LENS DATA (WITH ATTACHMENT LENS MOUNTED)} |
| GR1 | 1 | 167.733 | 18.00 | 1.43875 | 95.0 | 1.2274 | 0.0600 |
| GR1 | 2 | -51.088 | 4.74 | 1.51680 | 64.2 | 1.2261 | -0.0054 |
| GR1 | 3 | -121.196 | 22.88 | | | | |
| GR2 | 4 | 92.069 | 6.00 | 1.48749 | 70.2 | 1.2209 | 0.0019 |
| GR2 | 5 | 35.902 | 20.00 | 1.59240 | 68.3 | 1.2430 | 0.0201 |
| GR2 | 6 | -2552.995 | 20.00 | | | | |
| GR3 | 7 | 41.874 | 20.00 | 1.61800 | 63.4 | 1.2403 | 0.0072 |
| GR3 | 8 | -34.748 | 4.98 | 1.83481 | 42.7 | 1.2658 | -0.0104 |
| GR3 | 9 | 21.227 | 8.00 | | | | |
| | 10 (STOP) | — | 8.00 | | | | |
| GR4 | 11 | -21.703 | 2.50 | 1.77250 | 49.6 | 1.2502 | -0.0116 |
| GR4 | 12 | 103.544 | 8.96 | 1.61800 | 63.4 | 1.2430 | 0.0072 |
| GR4 | 13 | -28.504 | 0.20 | | | | |
| GR5 | 14 | -1069.375 | 13.58 | 1.59240 | 68.3 | 1.2430 | 0.0201 |
| GR5 | 15 | -23.306 | 5.99 | 1.48749 | 70.2 | 1.2209 | 0.0019 |
| GR5 | 16 | -61.312 | 0.25 | | | | |
| GR6 | 17 | 203.200 | 3.00 | 1.51680 | 64.2 | 1.2261 | -0.0054 |
| GR6 | 18 | 44.594 | 17.44 | 1.43875 | 95.0 | 1.2274 | 0.0600 |
| GR6 | 19 | -54.770 | 30.00 | | | | |
| GR7 | 20 | 212.260 | 25.00 | 1.60311 | 60.7 | 1.2365 | -0.0022 |
| GR7 | 21 | 198.520 | 76.28 | | | | |

(FOCAL LENGTH f=234.00mm, MAGNIFICATION β=-0.87)

FIG. 19

| | EXAMPLE 8: LENS DATA | | | | | |
|---|---|---|---|---|---|---|
| | Si (SURFACE NUMBER) | Ri (RADIUS OF CURVATURE) | Di (SURFACE-TO-SURFACE SPACING) | ndj (REFRACTIVE INDEX) | νdj (ABBE NUMBER) | θg,dj (RELATIVE PARTIAL DISPERSION) | Δθg,dj (ABNORMAL DISPERSION) |
| GR1 | 1 | 57.965 | 9.00 | 1.48749 | 70.2 | 1.2209 | 0.0019 |
| | 2 | -1052.359 | 9.00 | | | | |
| GR2 | 3 | 54.605 | 6.00 | 1.56384 | 60.7 | 1.2349 | -0.0038 |
| | 4 | 15.502 | 8.99 | 1.59240 | 68.3 | 1.2430 | 0.0201 |
| | 5 | 67.662 | 0.50 | | | | |
| GR3 | 6 | 27.798 | 9.00 | 1.59240 | 68.3 | 1.2430 | 0.0201 |
| | 7 | 651.467 | 2.00 | 1.54072 | 47.2 | 1.2661 | -0.0007 |
| | 8 | 15.771 | 8.99 | | | | |
| | 9 (STOP) | — | 5.00 | | | | |
| GR4 | 10 | -13.577 | 2.00 | 1.56732 | 42.8 | 1.2760 | 0.0000 |
| | 11 | -61.481 | 5.00 | 1.59240 | 68.3 | 1.2430 | 0.0201 |
| | 12 | -21.076 | 0.50 | | | | |
| GR5 | 13 | -60.960 | 9.00 | 1.59240 | 68.3 | 1.2430 | 0.0201 |
| | 14 | -15.339 | 6.00 | 1.56384 | 60.7 | 1.2349 | -0.0038 |
| | 15 | -35.912 | 0.50 | | | | |
| GR6 | 16 | 1050.482 | 3.00 | 1.51680 | 64.2 | 1.2261 | -0.0054 |
| | 17 | 51.435 | 9.00 | 1.49700 | 81.6 | 1.2318 | 0.0365 |
| | 18 | -48.846 | | | | | |

(FOCAL LENGTH f=88.68mm, MAGNIFICATION β=−0.85)

EXAMPLE 1
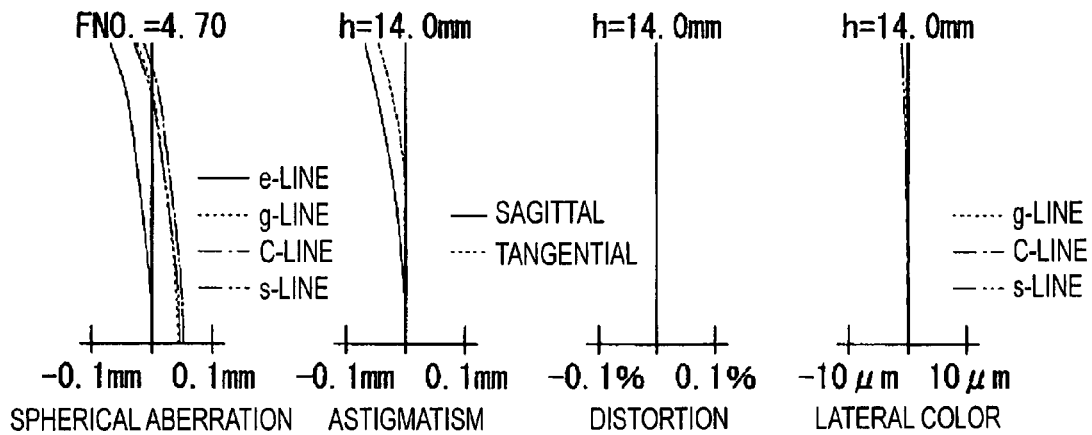
FIG. 20A SPHERICAL ABERRATION
FIG. 20B ASTIGMATISM
FIG. 20C DISTORTION
FIG. 20D LATERAL COLOR
EXAMPLE 1
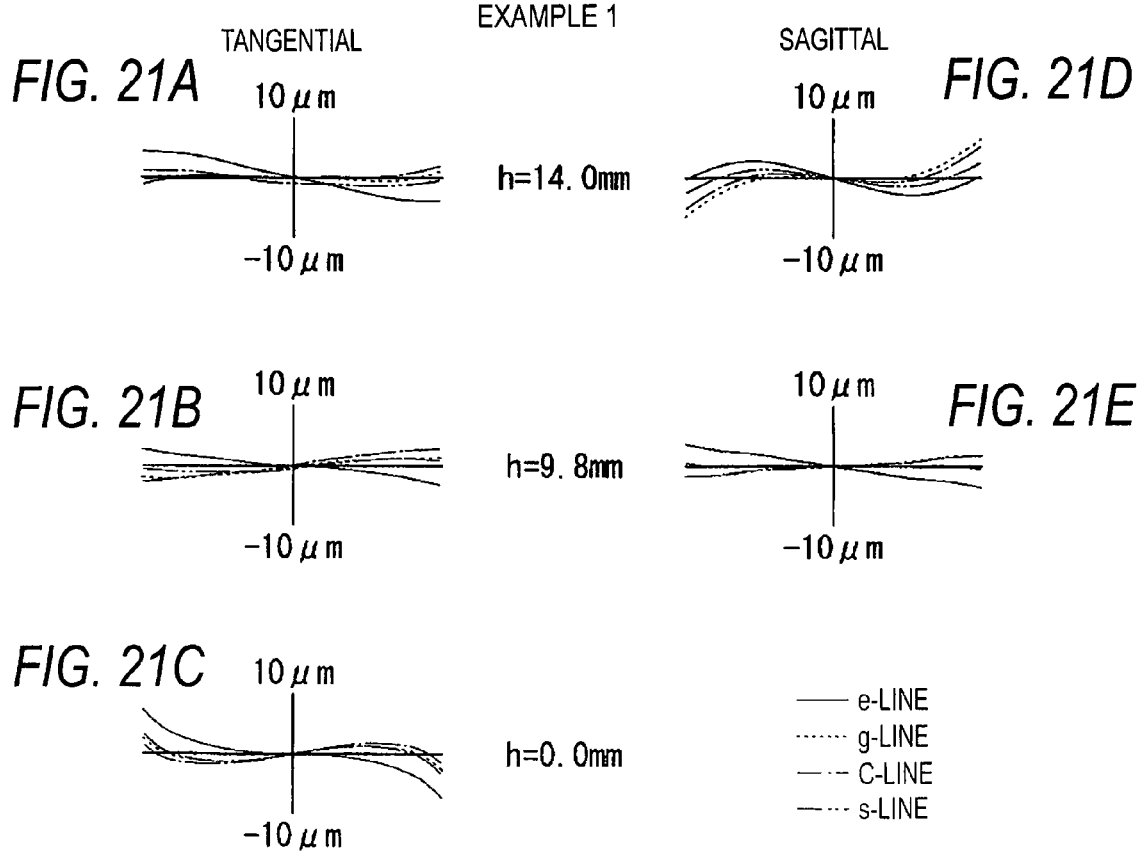

EXAMPLE 2
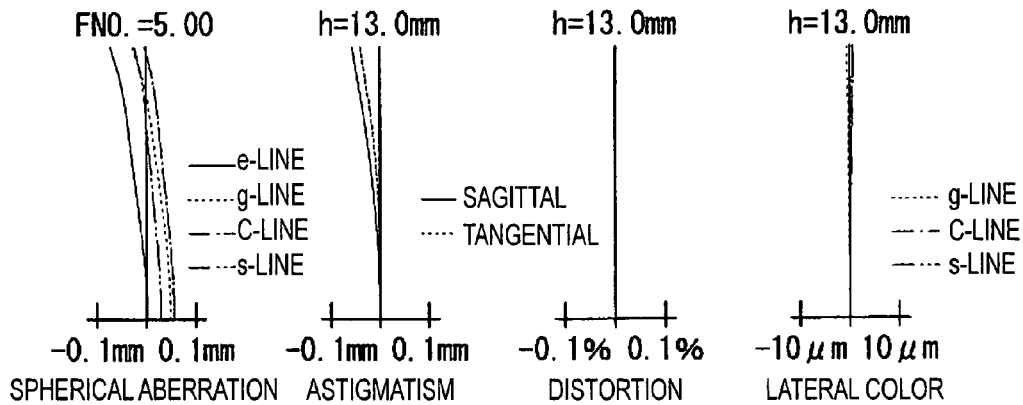
FIG. 22A SPHERICAL ABERRATION
FIG. 22B ASTIGMATISM
FIG. 22C DISTORTION
FIG. 22D LATERAL COLOR
EXAMPLE 2
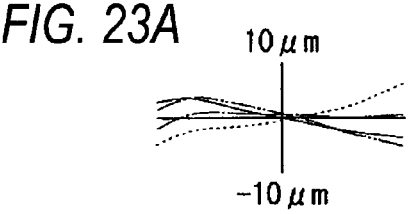
FIG. 23A TANGENTIAL h=13.0mm
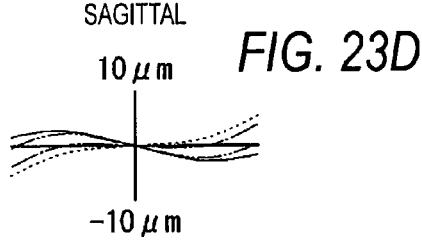
FIG. 23D SAGITTAL h=13.0mm
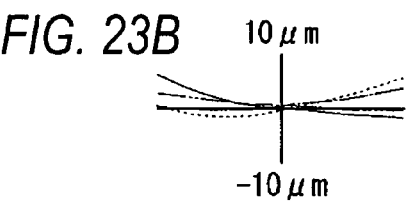
FIG. 23B h=9.1mm
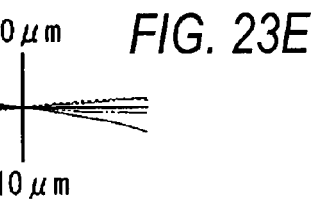
FIG. 23E h=9.1mm
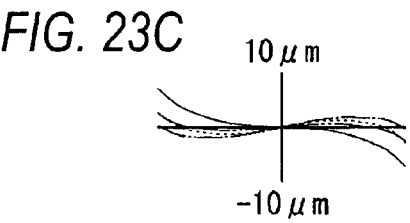
FIG. 23C h=0.0mm
— e-LINE
······ g-LINE
—·— C-LINE
—··· s-LINE

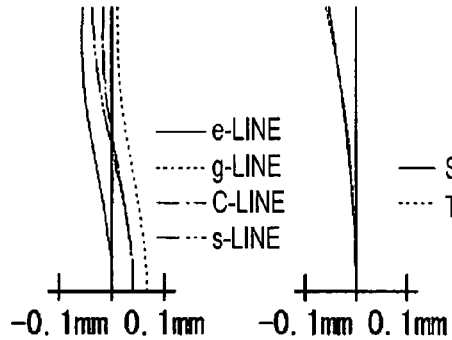
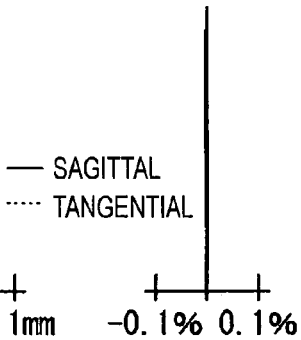
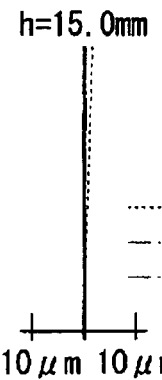
FNO.=4.10  h=15.0mm  h=15.0mm  h=15.0mm
—— e-LINE
······ g-LINE
—·— C-LINE
—··— s-LINE
—— SAGITTAL
······ TANGENTIAL
······ g-LINE
—·— C-LINE
—··— s-LINE
−0.1mm  0.1mm   −0.1mm  0.1mm   −0.1%  0.1%   −10μm  10μm
SPHERICAL ABERRATION  ASTIGMATISM  DISTORTION  LATERAL COLOR
*FIG. 24A*   *FIG. 24B*   *FIG. 24C*   *FIG. 24D*
EXAMPLE 3
*FIG. 25A*  TANGENTIAL       SAGITTAL  *FIG. 25D*
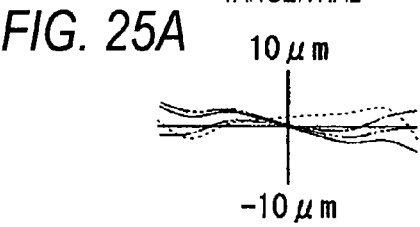 h=15.0mm 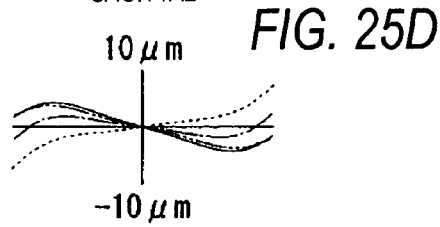
*FIG. 25B*                              *FIG. 25E*
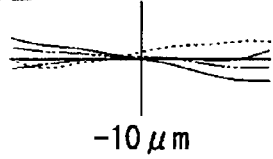 h=10.5mm 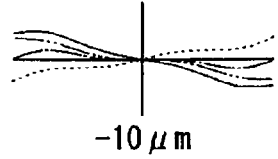
*FIG. 25C*
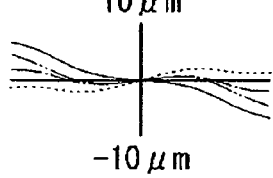 h=0.0mm
—— e-LINE
······ g-LINE
—·— C-LINE
—··— s-LINE

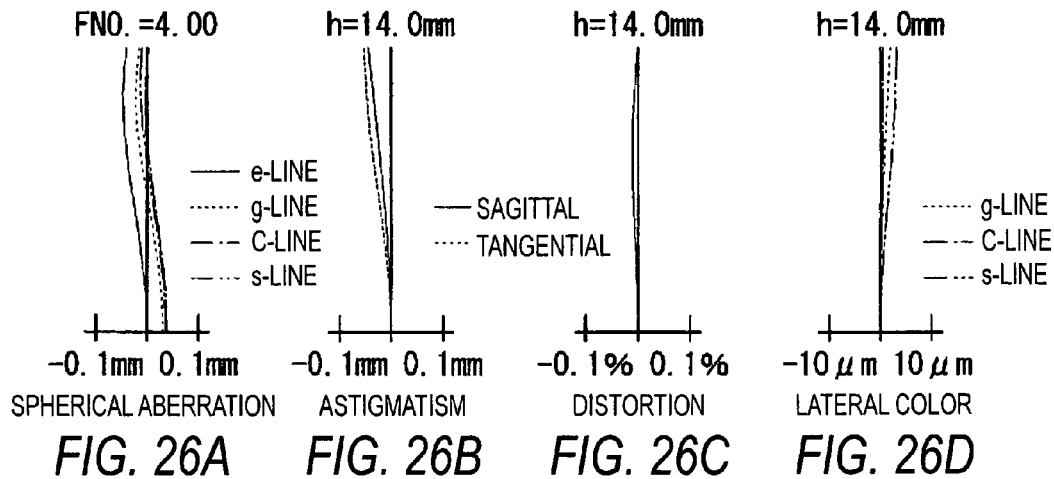
FIG. 26A SPHERICAL ABERRATION
FIG. 26B ASTIGMATISM
FIG. 26C DISTORTION
FIG. 26D LATERAL COLOR
EXAMPLE 4
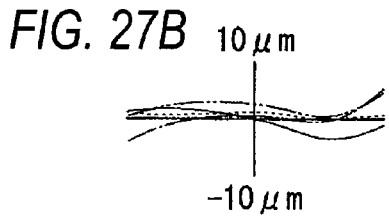
FIG. 27A
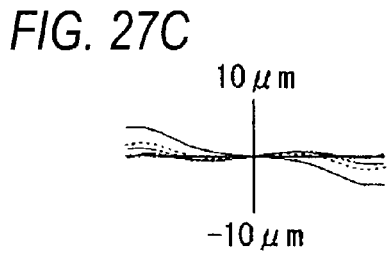
FIG. 27B
FIG. 27C
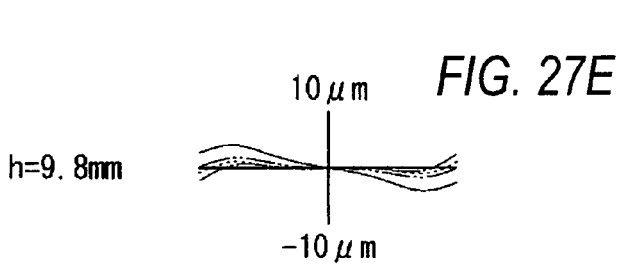
FIG. 27D
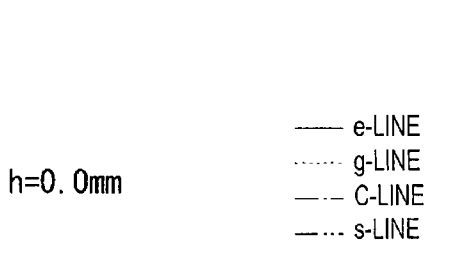
FIG. 27E EXAMPLE 4 (WITH ATTACHMENT LENS MOUNTED)
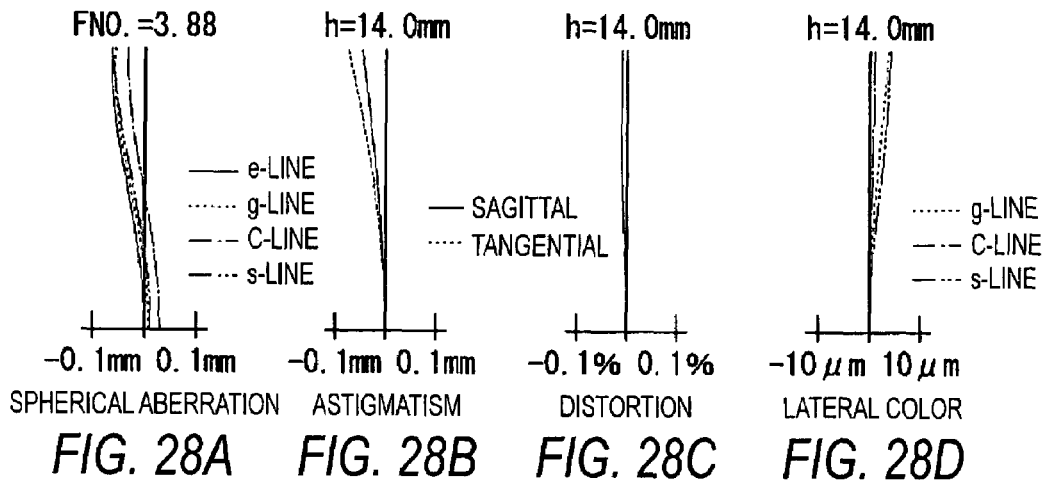
FIG. 28A  FIG. 28B  FIG. 28C  FIG. 28D
EXAMPLE 4 (WITH ATTACHMENT LENS MOUNTED)
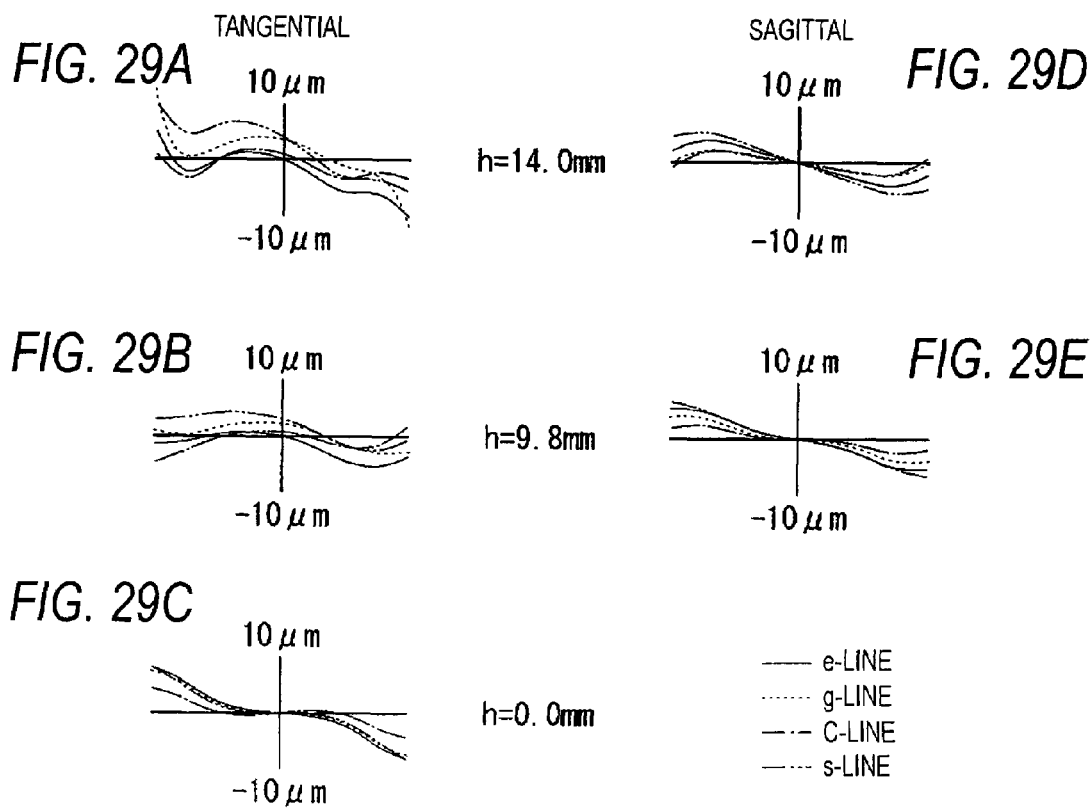

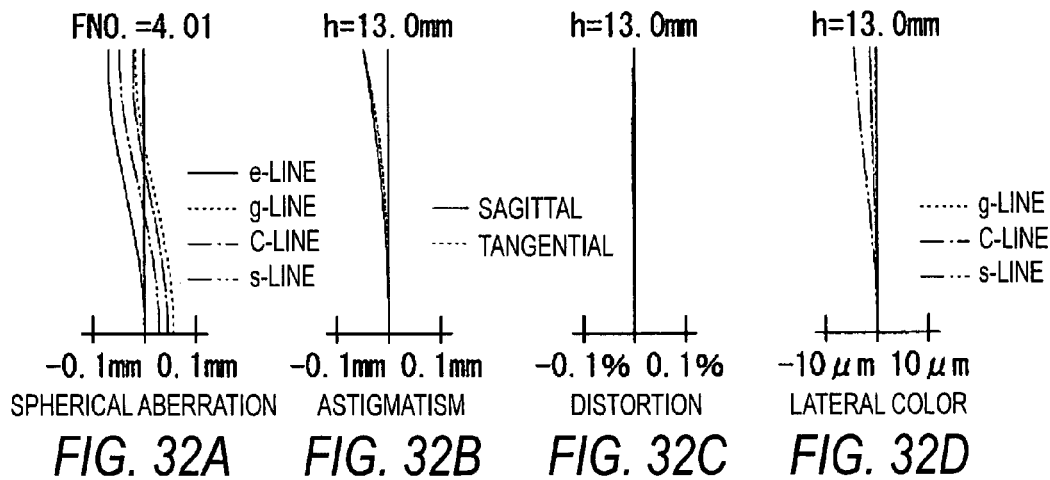
EXAMPLE 5 (WITH ATTACHMENT LENS MOUNTED)
FIG. 32A SPHERICAL ABERRATION
FIG. 32B ASTIGMATISM
FIG. 32C DISTORTION
FIG. 32D LATERAL COLOR
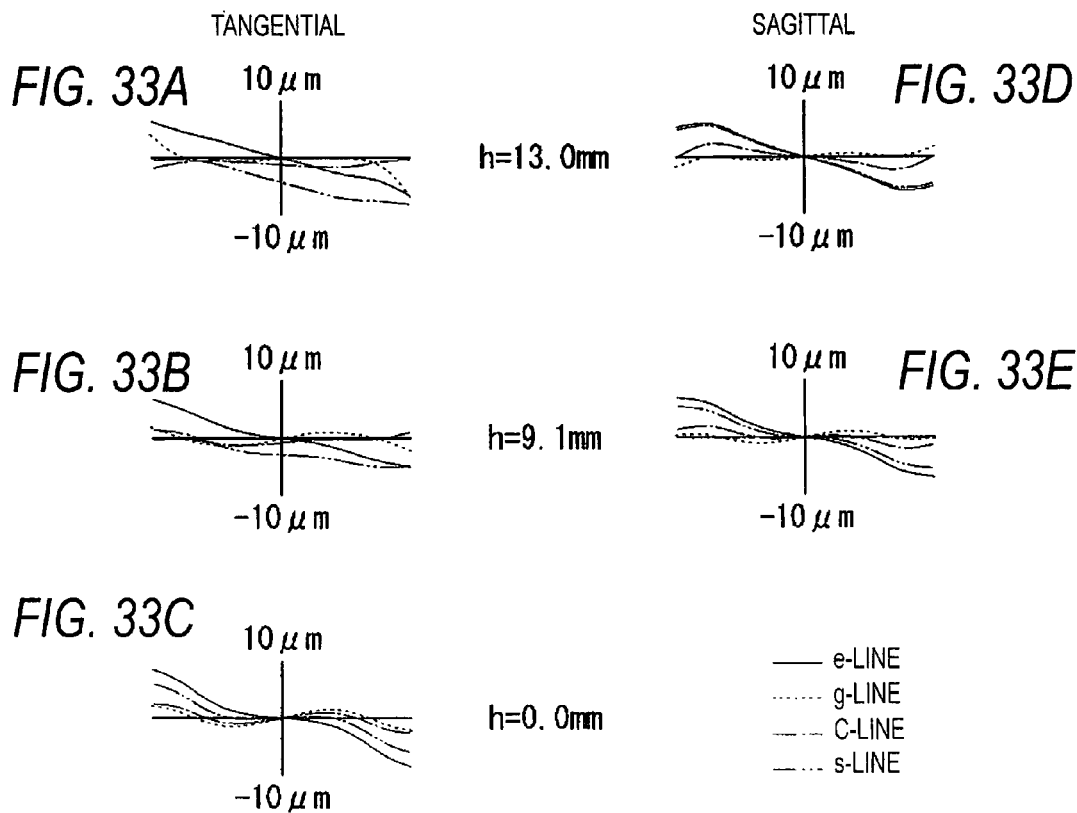
EXAMPLE 5 (WITH ATTACHMENT LENS MOUNTED)

EXAMPLE 6
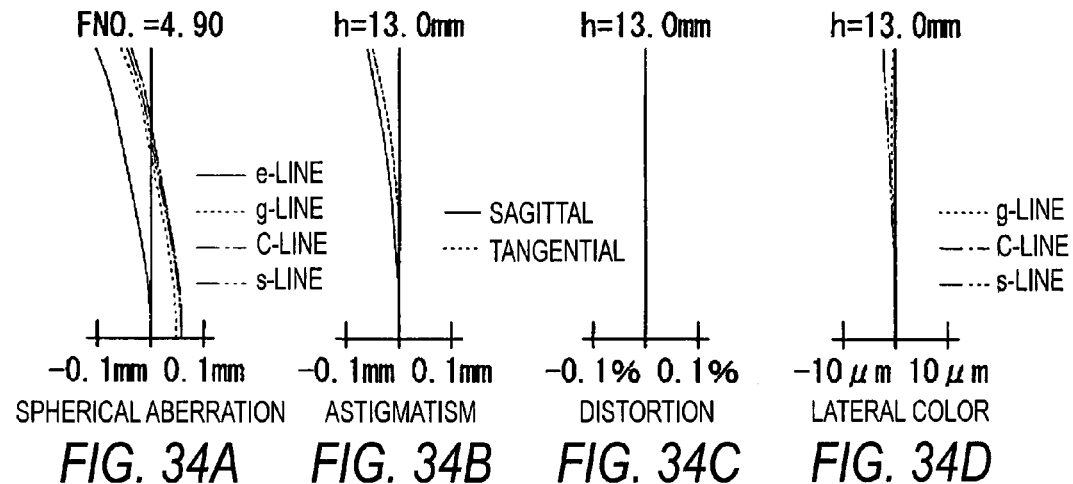
FIG. 34A SPHERICAL ABERRATION
FIG. 34B ASTIGMATISM
FIG. 34C DISTORTION
FIG. 34D LATERAL COLOR
EXAMPLE 6
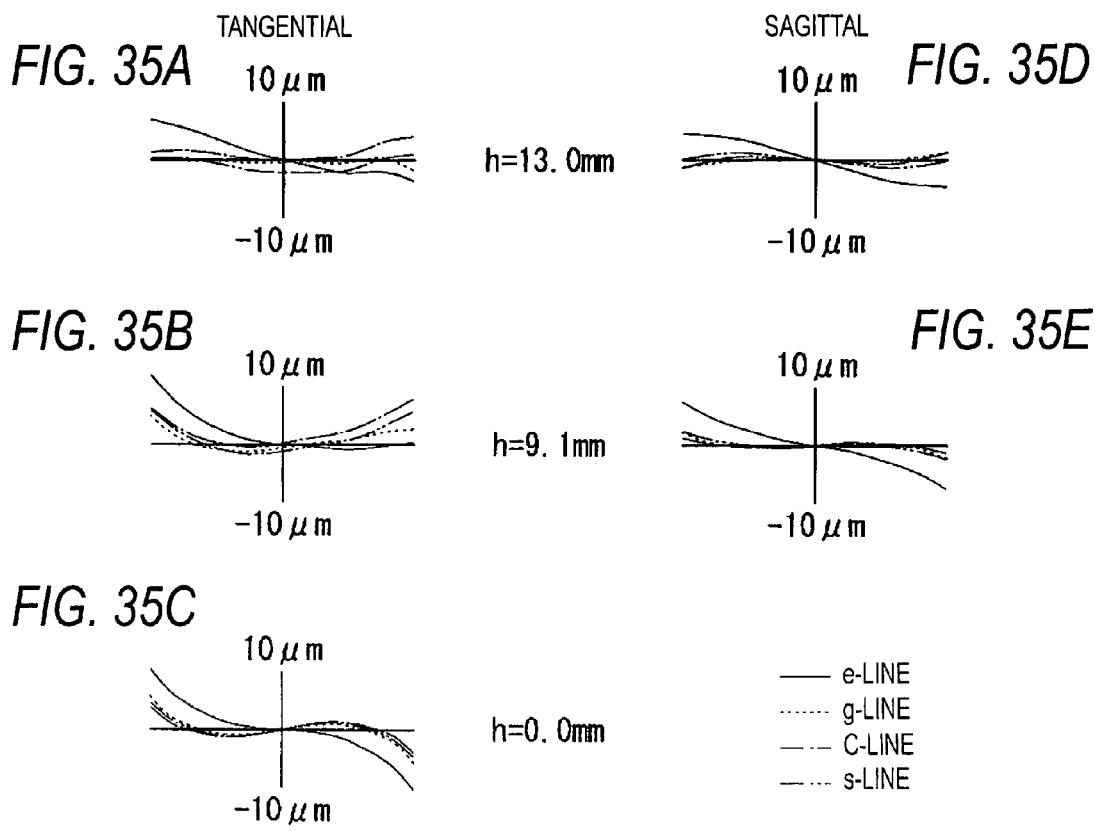

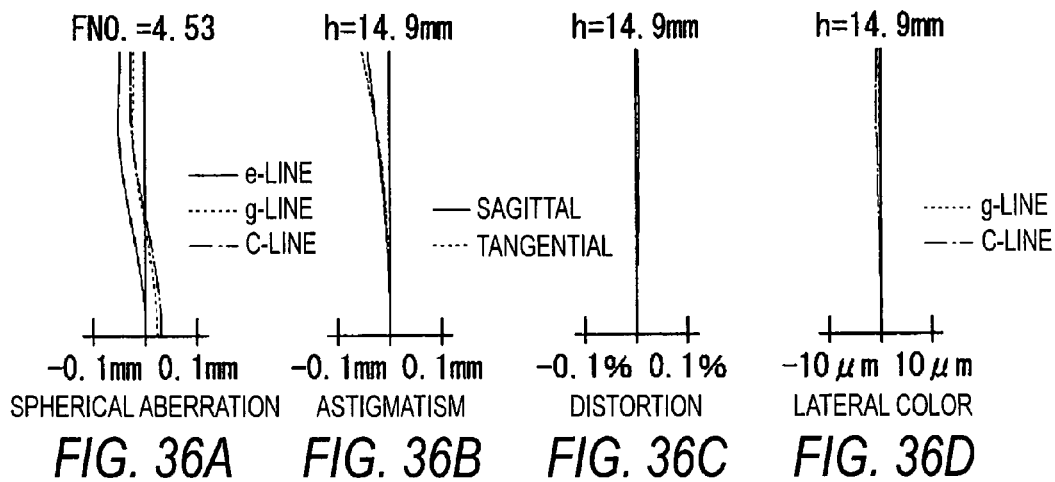
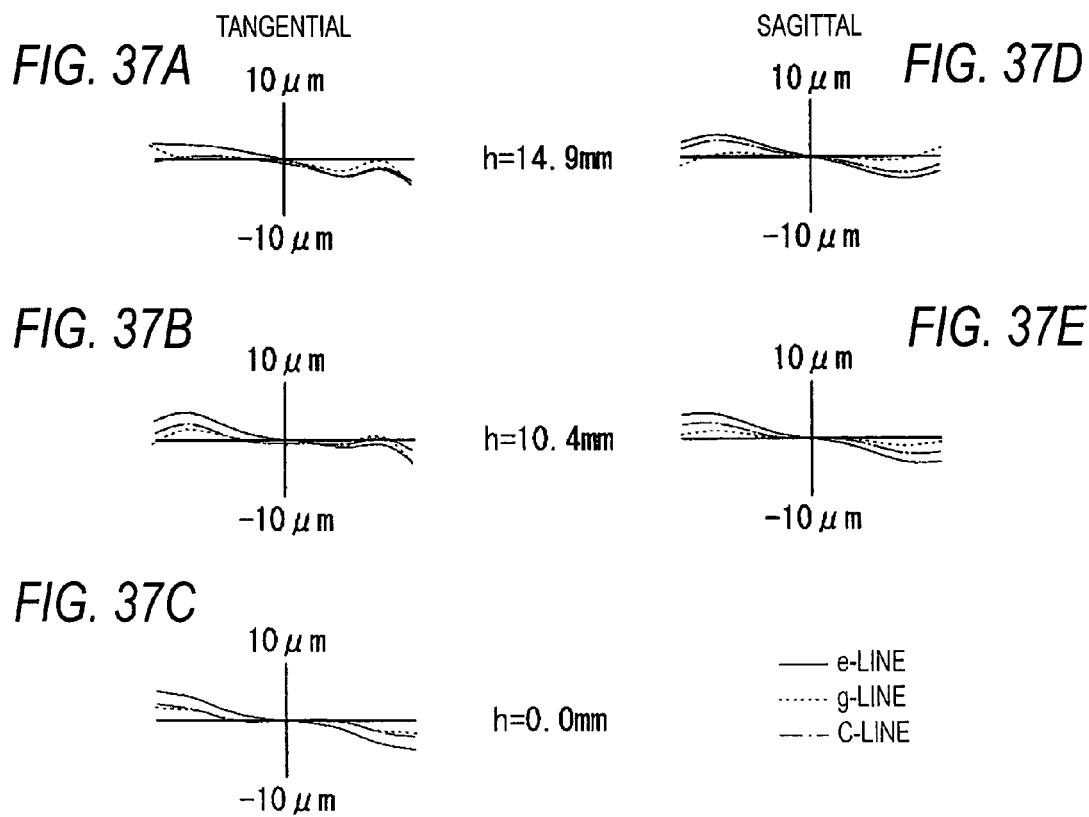

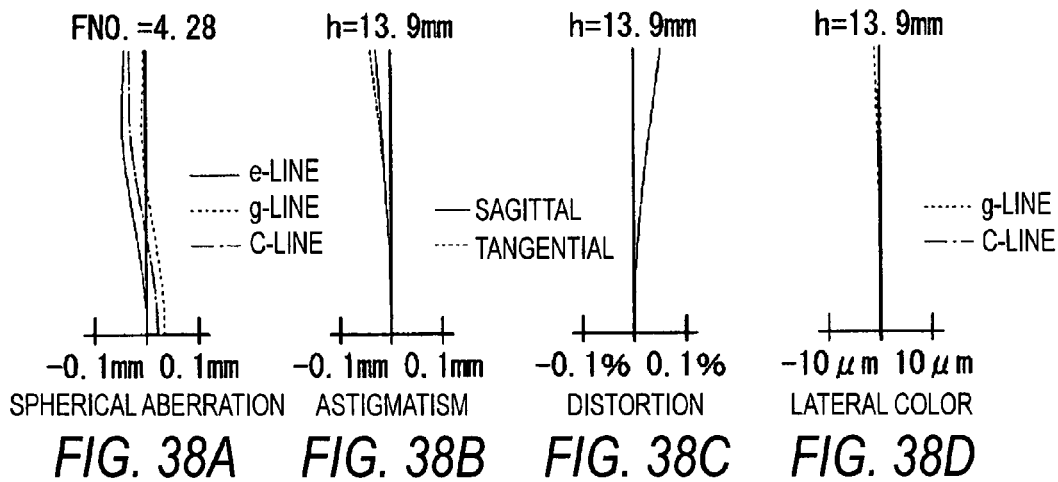
EXAMPLE 7 (WITH ATTACHMENT LENS MOUNTED)
FIG. 38A  FIG. 38B  FIG. 38C  FIG. 38D
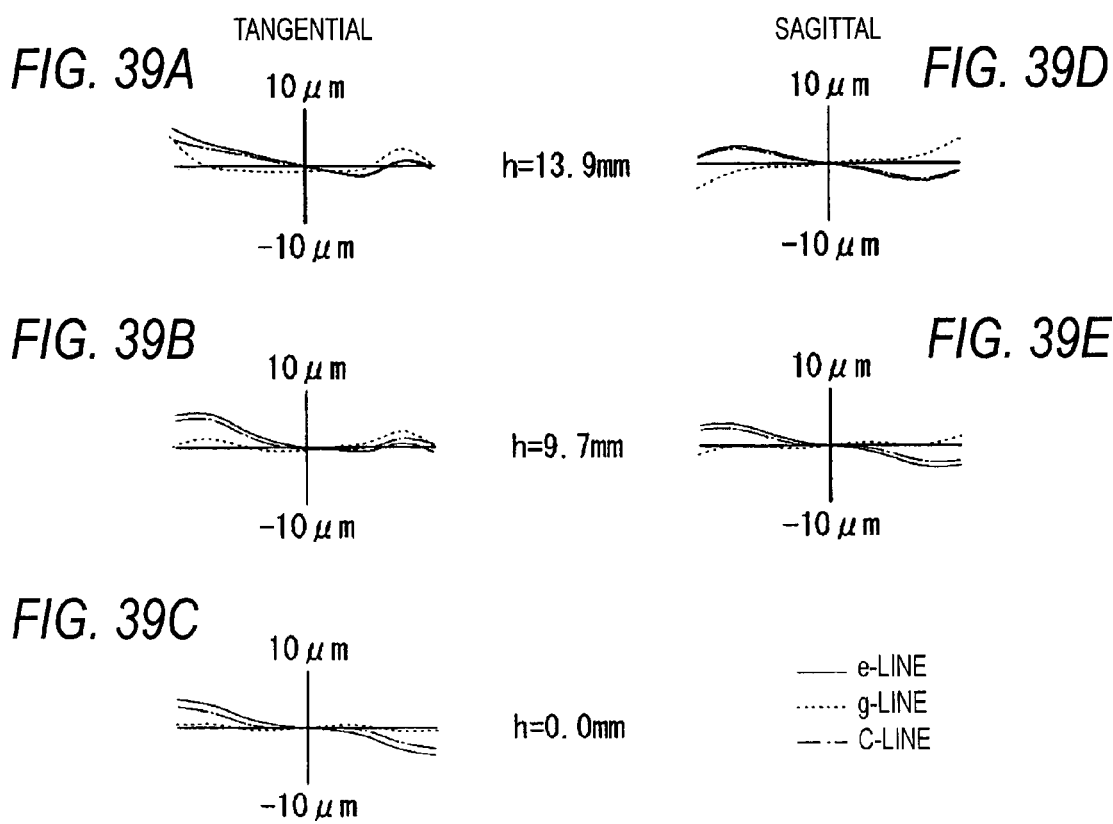
EXAMPLE 7 (WITH ATTACHMENT LENS MOUNTED)

EXAMPLE 8
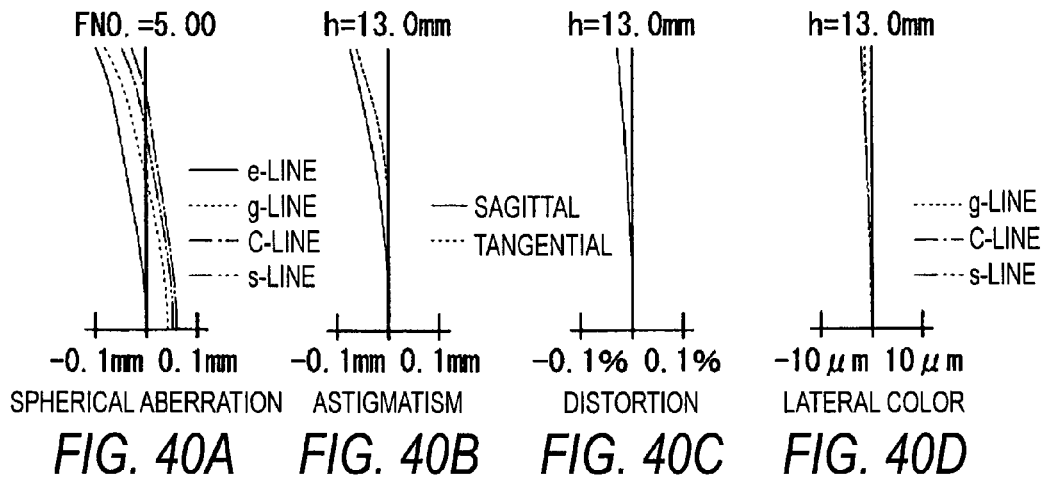
FIG. 40A  FIG. 40B  FIG. 40C  FIG. 40D
EXAMPLE 8
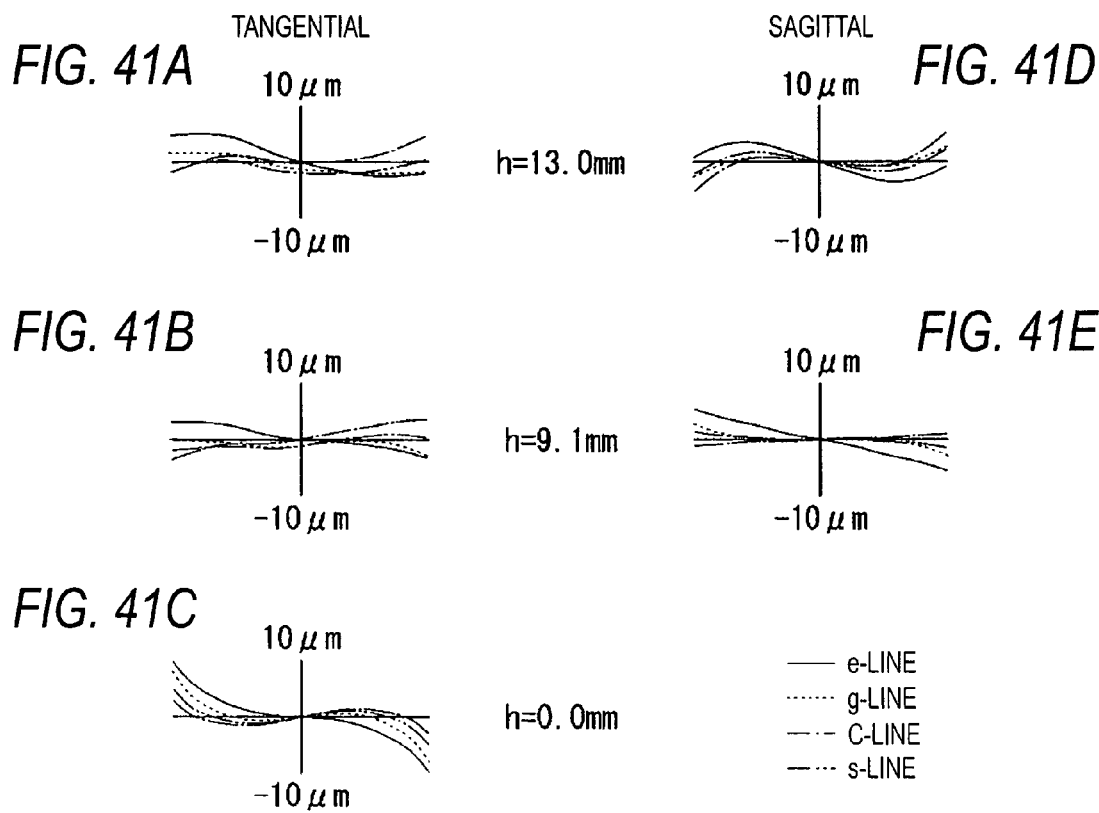

IMAGE READING LENS, IMAGE OPTICAL SYSTEM AND IMAGE READER

BACKGROUND OF THE INVENTION

1. Field of the Invention

The present invention relates to an image reading lens which is suited for the use at about same magnification (approximately ×0.6 to ×1.7), and relates to an imaging optical system and an image reader.

2. Description of Related Art

An image scanner is known, which is to take an image of a material such as a film, arranged at an effective distance, through an imaging lens in the imaging device such as a CCD (charge coupled device) and produce an electronic image therefrom. Meanwhile, digitization has being proceeded in the field of moving pictures. Such image readers have been developed as those to change the electronic image displayed on a display device such as an LCD (liquid-crystal display) into an optical image by an imaging lens and print it onto a moving-picture film and those conversely to take an image of a moving-picture film into an imaging device through the imaging lens and change it into an electronic image. Particularly, in the case such an image reader is used to capture a film image into the imaging device or so, there is a request to detect a microscopic scratch, a dust or the like as image information, and to digitally remove unwanted regions of images caused due to such a scratch, a dust or the like by image processing. It is a frequent practice to use near-infrared light in detecting a scratch, a dust or the like on a film. For this reason, an image reading lens preferably has a well optical characteristic in a wavelength range of from a visible to near-infrared region of light (e.g. approximately 900 nm), particularly a chromatic aberration well corrected both in magnification (i.e., lateral color) and on-axis (i.e., axis chromatic aberration). Meanwhile, it is preferable that aberrations, including distortion, are well corrected to provide the screen with high resolution in an area from a center to peripheral region thereof. Furthermore, where arranging a display device, such as an LCD, on the object side, it is frequently preferable to provide telecentricity to the object side. Meanwhile, where arranging an imaging device, such as a CCD, on the image side, it is frequently preferable to provide telecentricity on the image side. This is because the electronic device, such as an LCD and a CCD, in most cases has a dependence-upon-angle in the display or imaging characteristic thereof. In case a ray of light has an angle on the side where the electronic device is arranged, there is a possibility to cause so-called shading, i.e. lightness differing at between a center and a periphery of the image, thus deteriorating image quality.

Image reading lenses, corrected for aberrations in a range of from a visible to near-infrared region, include a lens described in JP-A-2002-148514 and JP-A-2002-287022. JP-A-2002-148514 describes an example that is wholly structured with six groups and fourteen lenses wherein the two lens groups, arranged on the object and image sides and adjacent to the aperture stop, are each structured with a cemented lens of three lenses. Meanwhile, JP-A-2002-287022 describes an example that is wholly structured with four groups and six lenses wherein the two lens groups, arranged on the object and image sides and adjacent to the aperture stop, are each structured with a cemented lens of two lenses.

The lens described in JP-A-2002-287022 is less in the number of lenses and advantageous in size reduction, but is insufficient in correcting aberrations where resolution is required higher. Meanwhile, the lens described in JP-A-2002-148514 is well corrected for aberrations by increasing the number of lenses. However, telecentricity is not provided at the object and image sides so that an electronic device cannot be suitably used. The lenses described in JP-A-2002-148514 and JP-A-2002-287022 are considered for the use only at a particular reference magnification wherein the imaging characteristic is not obtained well at a magnification other than the reference magnification. Accordingly, where applied to a moving-picture image reader for example, there is a need to inconveniently prepare a plurality of image reading lenses in order to cope with a plurality of film formats.

SUMMARY OF THE INVENTION

An object of an illustrative, non-limiting embodiment of the invention is to provide an image reading lens and imaging optical system that aberrations are to be corrected well, particularly axial chromatic aberration and magnification chromatic aberration (lateral color) are to be well corrected simultaneously, and an image reader capable of reading an image favorably by using those. Meanwhile, another object of an illustrative, non-limiting embodiment of the invention is to provide an image reading lens, imaging optical system and image reader capable of maintaining image quality well in a center to peripheral region even where using an electronic device on an object or image side. Still another object of an illustrative, non-limiting embodiment the invention is to provide an imaging optical system and image reader to be used at a magnification different from the reference magnification of the image reading lens.

According to an aspect of the invention, there is provided an image reading lens, comprising: in order from an object side thereof, a first lens group including at least one positive lens, wholly having a positive refractive power, and having a convex surface on the object side thereof; a second lens group including at least one positive lens, wholly having a positive refractive power, and a convex surface on the object side thereof; a third lens group of a cemented including a positive lens and a negative lens, the third lens group wholly having a negative refractive power and having a convex surface on the object side thereof; an aperture stop; a fourth lens group of a cemented lens including a positive lens and a negative lens, the fourth lens group wholly having a negative refractive power and having a convex surface on an image side thereof; a fifth lens group including at least one positive lens, wholly having a positive refractive power, and having a convex surface on the image side thereof; and a sixth lens group including at least one positive lens, wholly having a positive refractive power, and having a convex surface on the image side thereof. Provided that Abbe number at the d-line is vd; refractive indexes at the g-line, the d-line, the F-line and the C-line are ng, nd, nF and nC, respectively; relative partial dispersion at g-line and d-line is $\theta_{g,d}=(ng-nd)/(nF-nC)$; and abnormal dispersion is $\Delta\theta_{g,d}=\theta_{g,d}-1.365+0.00208\times vd$, then at least all positive lenses in each of the lens groups satisfy conditional expression (1) and at least two lenses of the first to third lens groups and at least two lenses of the fourth to sixth lens groups satisfy conditional expression (2):

$$vd > 60.0 \quad (1)$$

$$\Delta\theta_{g,d} > 0.015 \quad (2).$$

An imaging optical system according to an aspect of the invention has the image reading lens and an attachment lens mounted on the image reading lens on the image or object side thereof and for changing the image magnification of the image reading lens.

Here, one of a spacing may be changed of between the first lens group and the second lens group and between the fifth lens group and the sixth lens group is changed, as compared to a case where the image reading lens is singly used.

An image reader according to an aspect of the invention has the image reading lens or the imaging optical system.

BRIEF DESCRIPTION OF THE DRAWINGS

The features of the invention will appear more fully upon consideration of the exemplary embodiment of the invention, which are schematically set forth in the drawings, in which:

FIG. 4A is a sectional view of a lens, showing a fourth configuration example of an image reading lens according to an exemplary embodiment of the invention, and FIG. 4B is a section view of an imaging optical system mounted with an attachment lens on the image reading lens of the fourth configuration example;

FIG. 9 is a figure showing lens data of the image reading lens of example 1;

FIG. 10 is a figure showing lens data of the image reading lens of example 2;

FIG. 11 is a figure showing lens data of the image reading lens of example 3;

FIG. 12 is a figure showing lens data of the image reading lens of example 4;

FIG. 13 is a figure showing lens data of the imaging optical system mounted with an attachment lens on the image reading lens of example 4;

FIG. 14 is a figure showing lens data of the image reading lens of example 5;

FIG. 15 is a figure showing lens data of the imaging optical system mounted with an attachment lens on the image reading lens of example 5;

FIG. 16 is a figure showing lens data of the image reading lens of example 6;

FIG. 17 is a figure showing lens data of the image reading lens of example 7;

FIG. 18 is a figure showing lens data of the imaging optical system mounted with an attachment lens on the image reading lens of example 7;

FIG. 19 is a figure showing lens data of the image reading lens of example 8;

FIG. 20 is aberration diagrams showing aberrations on the image reading lens of example 1, wherein (A) shows a spherical aberration, (B) an astigmatism, (C) a distortion and (D) a lateral color;

FIG. 21 is aberration diagrams showing lateral aberrations on the image reading lens of example 1;

FIG. 22 is aberration diagrams showing aberrations on the image reading lens of example 2, wherein (A) shows a spherical aberration, (B) an astigmatism, (C) a distortion and (D) a lateral color;

FIG. 23 is aberration diagrams showing lateral aberrations on the image reading lens of example 2;

FIG. 24 is aberration diagrams showing aberrations on the image reading lens of example 3, wherein (A) shows a spherical aberration, (B) an astigmatism, (C) a distortion and (D) a lateral color;

FIG. 25 is aberration diagrams showing lateral aberrations on the image reading lens of example 3;

FIG. 26 is aberration diagrams showing aberrations on the image reading lens of example 4, wherein (A) shows a spherical aberration, (B) an astigmatism, (C) a distortion and (D) a lateral color;

FIG. 27 is aberration diagrams showing lateral aberrations on the image reading lens of example 4;

FIG. 28 is aberration diagrams showing aberrations on the imaging optical system mounted with an attachment lens on the image reading lens of example 4, wherein (A) shows a spherical aberration, (B) an astigmatism, (C) a distortion and (D) a lateral color;

FIG. 29 is aberration diagrams showing lateral aberration on the imaging optical system mounted with an attachment lens on the image reading lens of example 4;

FIG. 32 is aberration diagrams showing aberrations on the imaging optical system mounted with an attachment lens on the image reading lens of example 5, wherein (A) shows a spherical aberration, (B) an astigmatism, (C) a distortion and (D) a lateral color;

FIG. 33 is aberration diagrams showing lateral aberration on the imaging optical system mounted with an attachment lens on the image reading lens of example 5.

FIG. 34 is aberration diagrams showing aberrations on the image reading lens of example 6, wherein (A) shows a spherical aberration, (B) an astigmatism, (C) a distortion and (D) a lateral color;

FIG. 35 is aberration diagrams showing lateral aberrations on the image reading lens of example 6;

FIG. 36 is aberration diagrams showing aberrations on the image reading lens of example 7, wherein (A) shows a spherical aberration, (B) an astigmatism, (C) a distortion and (D) a lateral color;

FIG. 37 is aberration diagrams showing lateral aberration on the image reading lens of example 7;

FIG. 38 is aberration diagrams showing aberrations on the imaging optical system mounted with an attachment lens on the image reading lens of example 7, wherein (A) shows a spherical aberration, (B) an astigmatism, (C) a distortion and (D) a lateral color;

FIG. 39 is aberration diagrams showing lateral aberration on the imaging optical system mounted with an attachment lens on the image reading lens of example 7;

FIG. 40 is aberration diagrams showing aberrations on the image reading lens of example 8, wherein (A) shows a spherical aberration, (B) an astigmatism, (C) a distortion and (D) a lateral color;

FIG. 41 is aberration diagrams showing lateral aberration on the image reading lens of example 8.

DETAILED DESCRIPTION OF THE EXEMPLARY EMBODIMENTS

Figure 1:
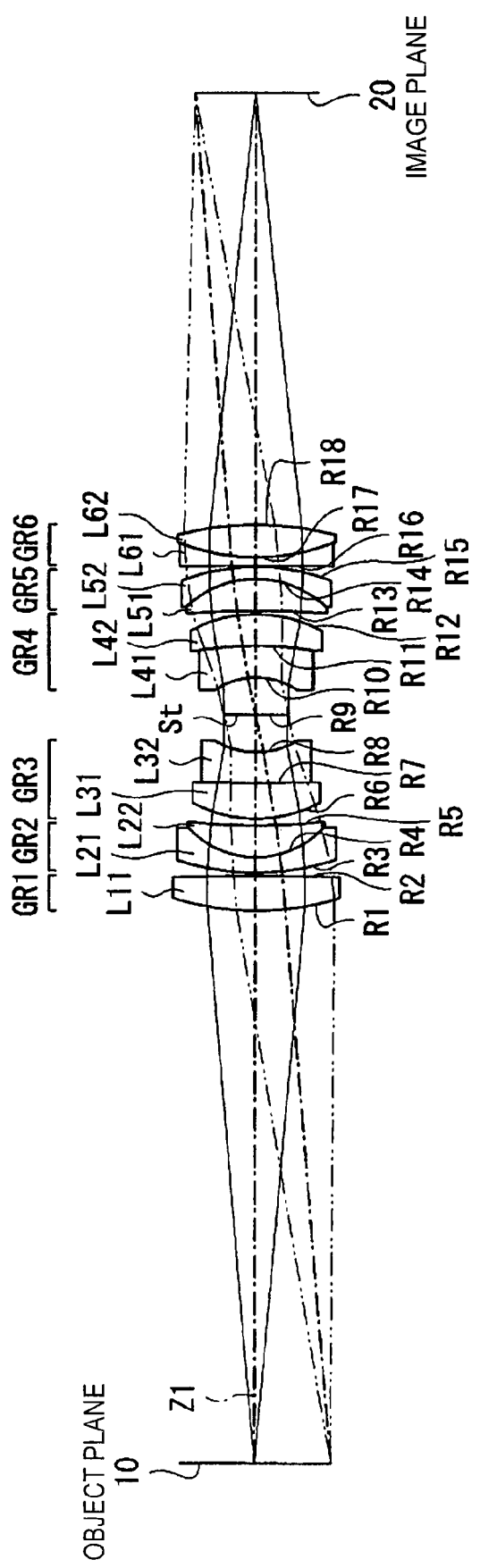
FIG. 1 is a sectional view of a lens, showing a first configuration example of an image reading lens according to an exemplary embodiment of the invention.

Although the invention will be described below with reference to exemplary embodiments thereof, the following exemplary embodiments and modifications do not restrict the invention.

In an image reading lens of an exemplary embodiment of the invention, the first to third lens groups are arranged on the object side with respect to an aperture stop St while the fourth to sixth lens groups are arranged on the image side. This provides a symmetric lens configuration about the aperture stop, thus being advantageous in the imaging characteristic at around ×1 (approximately ×0.6 to ×1.7). Meanwhile, by fully using the lenses smaller in dispersion to meet the conditional expression (1) and the lenses greater in abnormal dispersion to meet the conditional expression (2), correction can be made with balance simultaneously for aberrations, particularly axial chromatic aberration and lateral color in the range of from a visible to infrared region.

The image reading lens is capable of obtaining more preferable characteristic suited for image reading by properly adopting and satisfying the following preferable conditions in accordance with the specification requested.

In the image reading lens, the lenses constituting the first, second, fifth and sixth lens groups all preferably satisfy the conditional expression (1). In the image reading lens, all positive lenses of each of the lens groups preferably satisfy the conditional expression (2).

This makes it possible to correct axial chromatic aberration and lateral color favorably.

In the image reading lens, telecentricity may be provided on one of object side and image side.

This makes it possible to prevent shading from occurring resulting from dependence upon angle even where using an electronic device having dependence upon angle at the object or image side thereof, thus maintaining image quality in a center to peripheral region. Meanwhile, the sensitivity upon magnification adjustment is suppressed to facilitate the adjustment to a desired image magnification.

In the image reading lens, the first lens group may be a cemented lens consisting of positive and negative lenses, the cemented lens wholly having a positive refractive power and having a convex surface on the object side thereof; the second lens group may be a cemented lens consisting of positive and negative lenses, the cemented lens wholly having a positive refractive power and having a convex surface on the object side thereof; the fifth lens group may be a cemented lens consisting of positive and negative lenses, the cemented lens wholly having a positive refractive power and having a convex surface on the image side thereof; and the sixth lens group may be a cemented lens consisting of positive and negative lenses, the cemented lens wholly having a positive refractive power and having a convex surface on the image side thereof.

Due to this, each of the lens groups is perfectly structured with a cemented lens, which is further advantageous in correcting for chromatic aberration.

An imaging optical system according to an exemplary embodiment of the invention is mounted with an attachment lens on its image reading lens, to obtain an image magnification different from that of the image reading lens used singly. In this case, by changing either one of a spacing between the first lens group and the second lens group and a spacing between the fifth lens group and the sixth lens group as compared to the case using the image reading lens singly, imaging characteristic can be obtained well by suppressing the variation of aberration despite the image magnification is different from the reference magnification.

An image reader according to an exemplary embodiment of the invention is to read out an image well by virtue of the provision of the image reading lens or imaging optical system according to the invention.

With reference to the drawings, explanation will be now made on exemplary embodiments according to the present invention.

Figure 2:
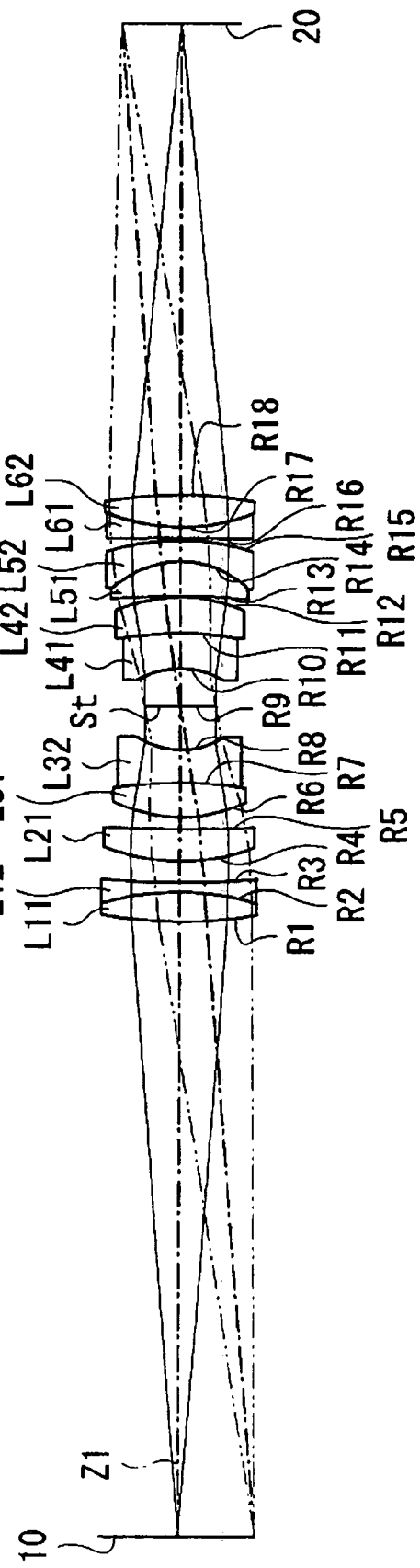
FIG. 2 is a sectional view of a lens, showing a second configuration example of an image reading lens according to an exemplary embodiment of the invention.
Figure 3:
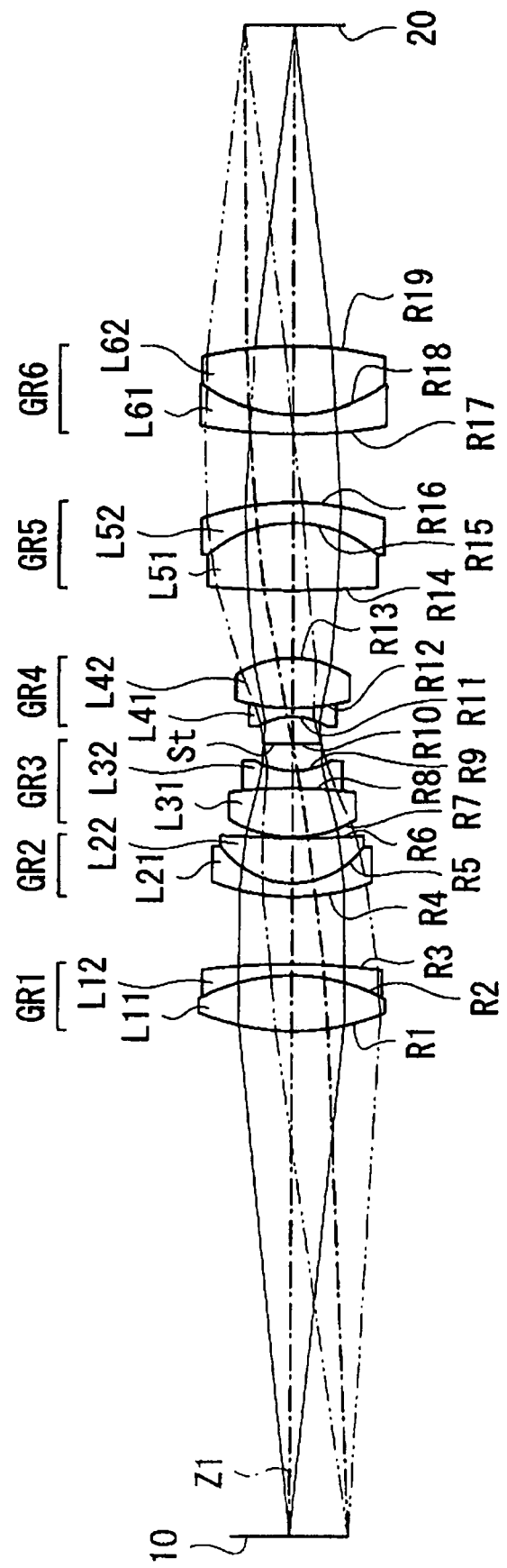
FIG. 3 is a sectional view of a lens, showing a third configuration example of an image reading lens according to an exemplary embodiment of the invention.
Figure 5A:
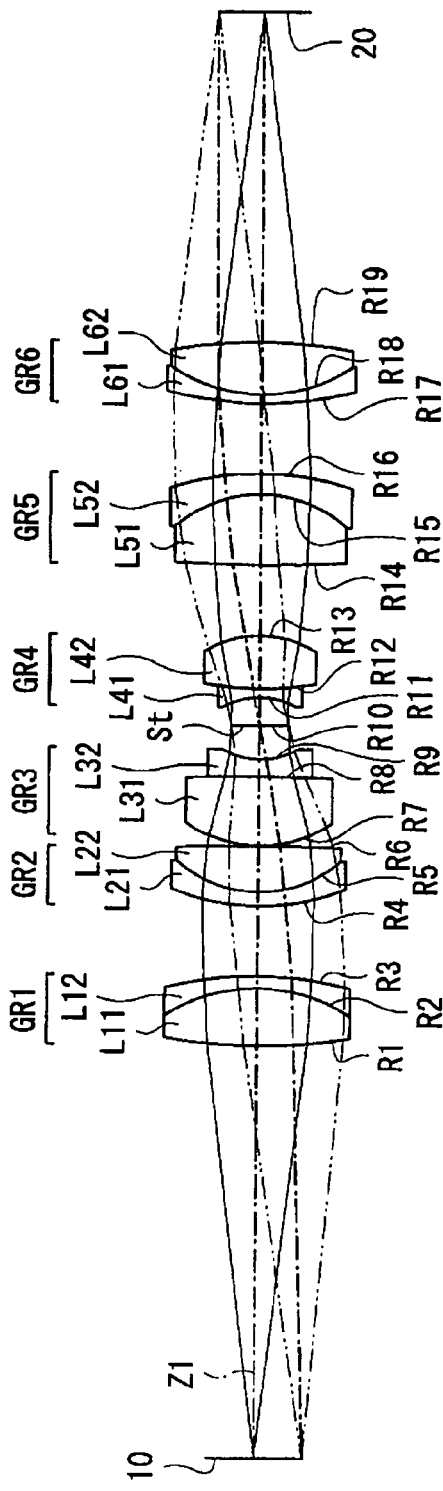
FIG. 5A is a sectional view of a lens, showing a fifth configuration example of an image reading lens according to an exemplary embodiment of the invention.
Figure 5B:
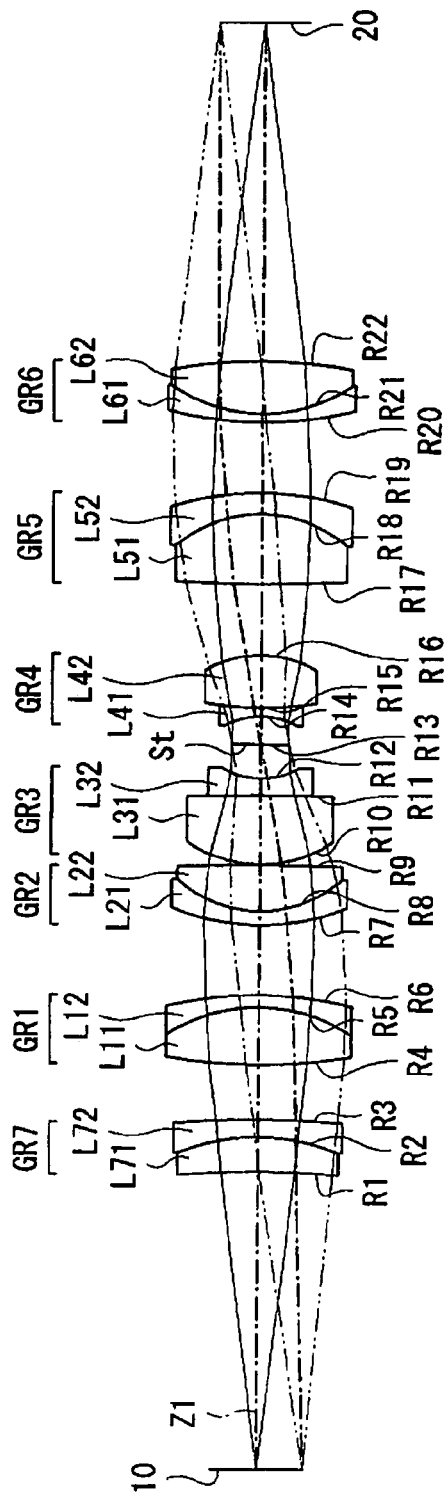
FIG. 5B is a section view of an imaging optical system mounted with an attachment lens on the image reading lens of the fifth configuration example.
Figure 6:
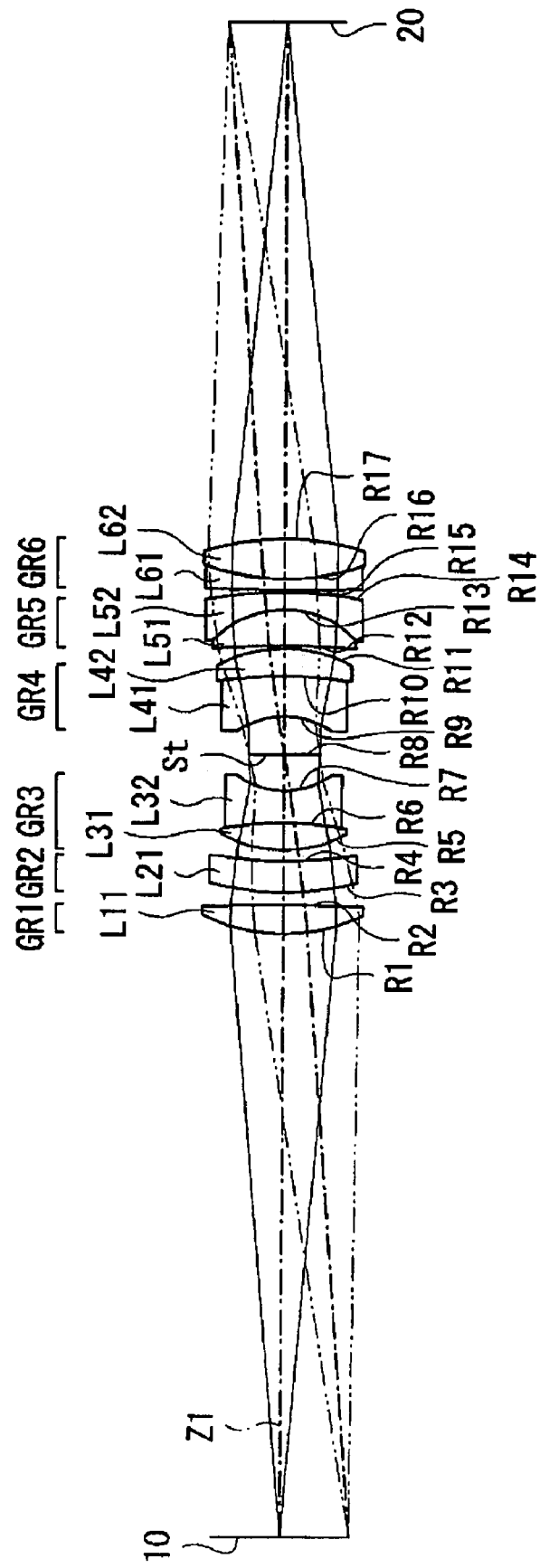
FIG. 6 is a sectional view of a lens, showing a sixth configuration example of an image reading lens according to an exemplary embodiment of the invention.
Figure 7A:
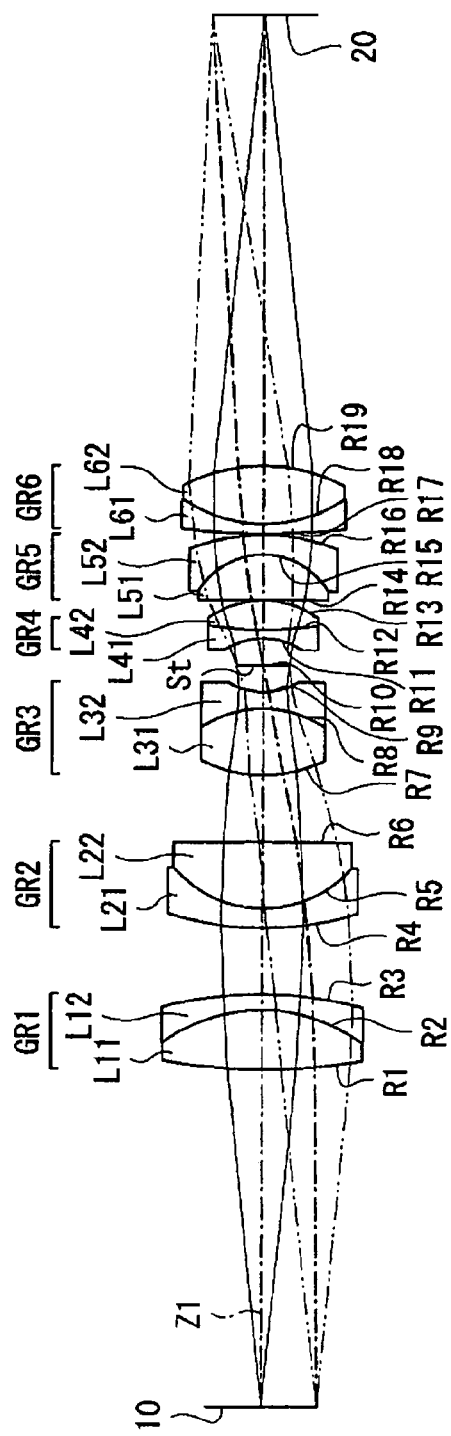
FIG. 7A is a sectional view of a lens, showing a seventh configuration example of an image reading lens according to an exemplary embodiment of the invention.
Figure 7B:
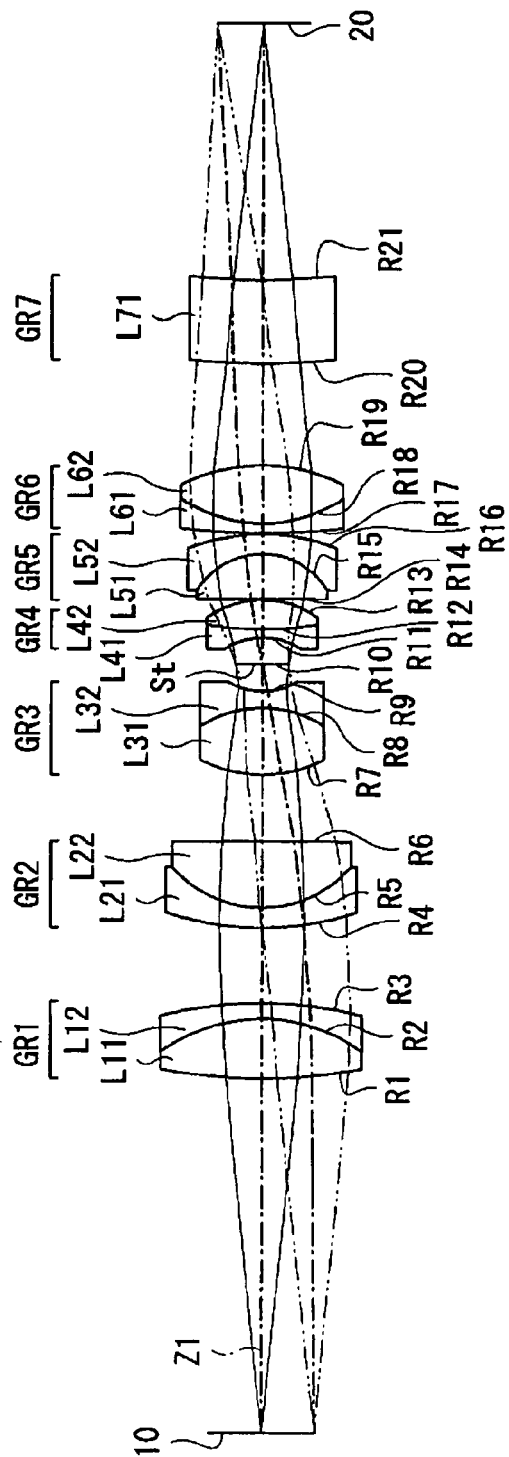
FIG. 7B is a section view of an imaging optical system mounted with an attachment lens on the image reading lens of the seventh configuration example.
Figure 8:
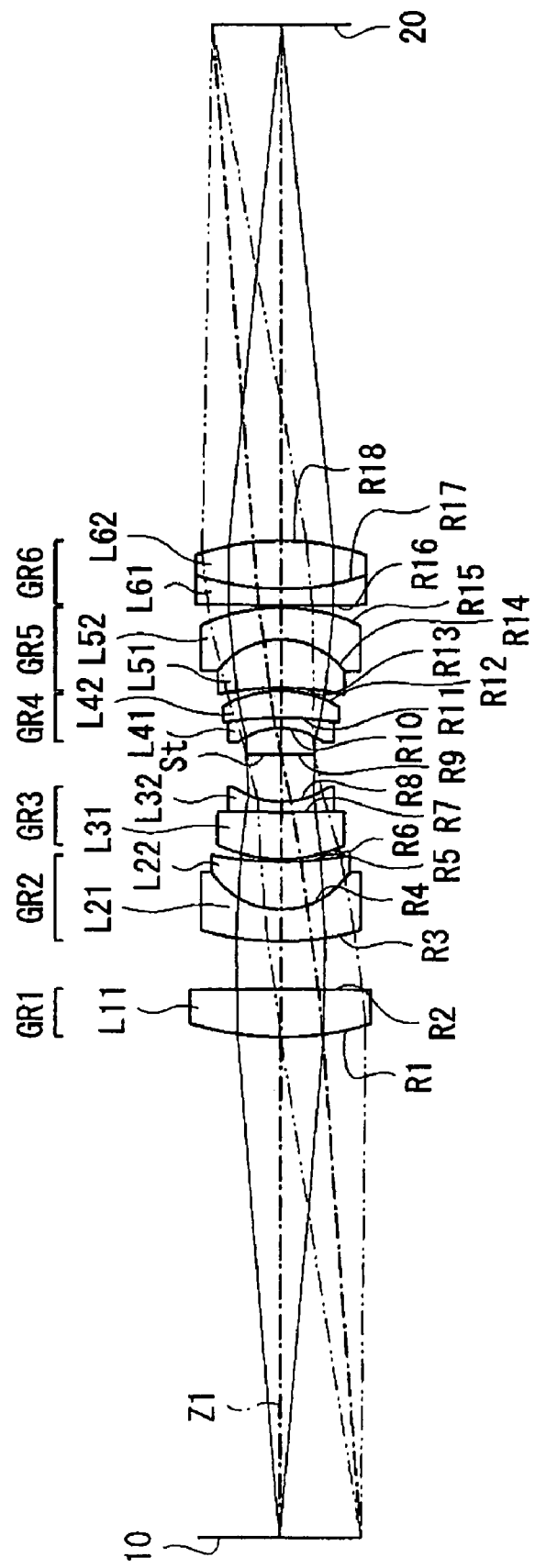
FIG. 8 is a sectional view of a lens, showing a eighth configuration example of an image reading lens according to an exemplary embodiment of the invention.
Figures 30A, 30B, 30C, 30D:
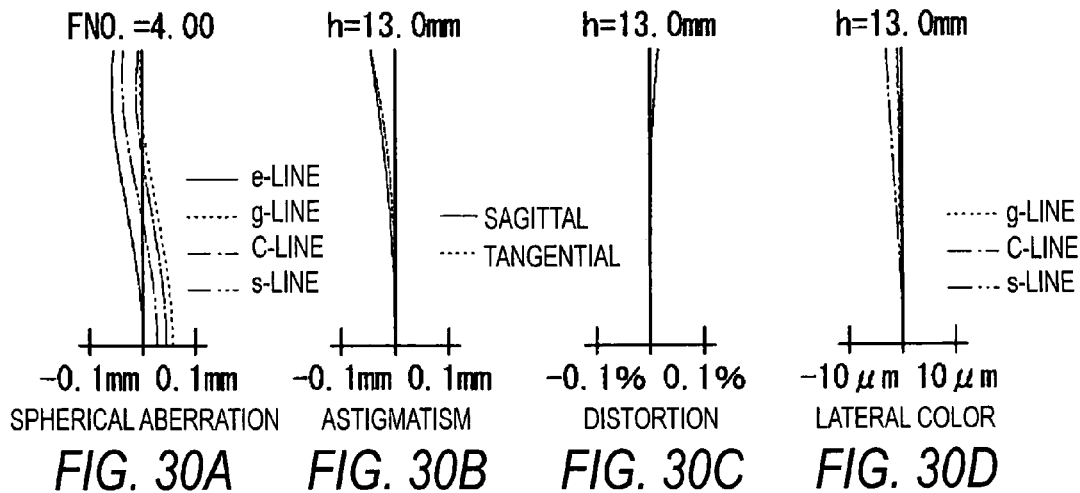
FIG. 30 is aberration diagrams showing aberrations on the image reading lens of example 5, wherein (A) shows a spherical aberration, (B) an astigmatism, (C) a distortion and (D) a lateral color.
Figures 31A, 31B, 31C, 31D, 31E:
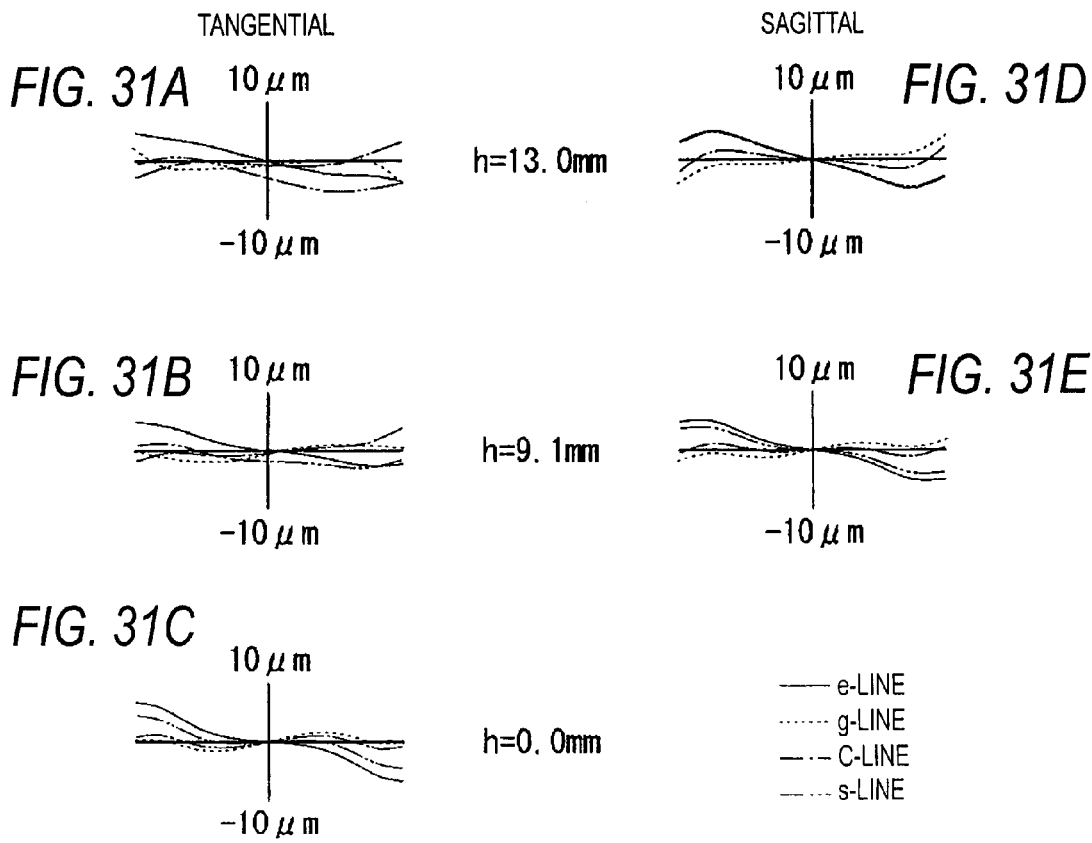
FIG. 31 is aberration diagrams showing lateral aberrations on the image reading lens of example 5.

FIG. 1 shows a first configuration example of an image reading lens according to an embodiment of the invention. This configuration example corresponds to a first numerical example of lens configuration (FIG. 9), referred later. FIG. 2 shows a second configuration example corresponding to a second numerical example of lens configuration (FIG. 10), referred later. FIG. 3 shows a third configuration example corresponding to a third numerical example of lens configuration (FIG. 11), referred later. FIG. 4A shows a fourth configuration example corresponding to a fourth numerical example of lens configuration (FIG. 12), referred later. FIG. 4B shows an imaging optical system, that an attachment lens is mounted to the FIG. 4(A) image reading lens, corresponding to a numerical example of lens configuration shown in FIG. 13, referred later. FIG. 5A shows a fifth configuration example corresponding to a fifth numerical example of lens configuration (FIG. 14), referred later. FIG. 5B shows an imaging optical system, that an attachment lens is mounted to the FIG. 5A image reading lens, corresponding to a numerical example of lens configuration shown in FIG. 15, referred later. FIG. 6 shows a sixth configuration example corresponding to a sixth numerical example of lens configuration (FIG. 16), referred later. FIG. 7A shows a seventh configuration example corresponding to a seventh numerical example of lens configuration (FIG. 17), referred later. FIG. 7B shows an imaging optical system, that an attachment lens is mounted to the FIG. 7A image reading lens, corresponding to a numerical example of lens configuration example shown in FIG. 18, referred later. FIG. 8 shows an eighth configuration example corresponding to an eighth numerical example of lens configuration (FIG. 19), referred later.

In the configuration figures, reference numeral Ri represents a radius of curvature of an i-th surface as counted in a manner gradually increasing toward the image provided that the surface of a constituent element closest to the object is taken as the first. In the configuration figures, there are illustrated an on-axis ray of light to be focused on an optical axis Z1 and an off-axis ray of light to be focused off the axis. In the configuration figures, reference numeral 10 designates an object plane corresponding to a material surface (surface of a movie film, a screen surface of a display device such as an LCD). Meanwhile, reference numeral 20 designates an image plane corresponding to a surface of a movie film, an image surface of an imager device such as a CCD.

The image reading lenses, in the illustrated configurations, each make up a reduction optical system. However, those can be used as magnification optical system if the elements are replaced between the object and image sides. Namely, because the object plane 10 and the image plane 20 are in a conjugate relationship with each other, a magnification optical system is obtained by taking the shown object plane 10 shown as an image surface while the shown image plane 20 shown is as a material plane. This makes it possible to use the image reading lens of each configuration, at a magnification around ×1 (nearly ×0.6 to ×1.7).

The image reading lens is arranged with first, second and third lens groups GR1, GR2, GR3 on the object side with respect to an aperture stop St, and fourth, fifth and sixth lens groups GR4, GR5, GR6 on the image side. These lens groups are nearly in a symmetric configuration about the aperture stop St.

The first lens group GR1, including at least one positive lens, is wholly made as a positive-refractive lens group whose convex surface is directed toward the object side. In the first, sixth and eighth configuration examples (FIGS. 1, 6 and 8), the first lens group GR1 is structured by sole one lens L11 provided as a positive lens. In the second, third, fourth, fifth and seventh configuration examples (FIGS. 2, 3, 4(A), 5(A) and 7(A)), the first lens group GR1 is structured as a cemented lens with two lenses L11, L12. Of those, the lens L11 on the object side is provided positive while the lens L12 on the image side is negative.

The second lens group GR2, including at least one positive lens, is wholly made as a positive-refractive lens group whose convex surface is directed toward the object side. In the second and sixth configuration examples, the second lens group GR2 is structured by sole one lens L21 provided as a positive lens. In the other configuration examples, the second lens group GR2 is structured as a cemented lens with two lenses L11, L12. Of those, the lens L21 on the object side is provided negative while the lens L22 on the image side is positive.

The third lens group GR3, including positive and negative lenses, is wholly structured as a negative-refractive cemented lens whose convex surface is directed toward the object side. The fourth lens group GR4, including positive and negative lenses, is wholly structured as a negative-refractive cemented lens whose convex surface is directed toward the image side. In both configuration examples, the third lens group GR3 has an object-side lens L31 provided positive and an image-side lens L32 provided negative. Meanwhile, the fourth lens group GR4 has an object-side lens L41 provided negative and an image-side lens L42 provided positive. In each of the configuration examples, the two lens groups GR3, GR4 adjacent the aperture stop St are both structured as cemented lenses. Those are nearly in a symmetric configuration about the aperture stop St.

The fifth lens group GR5, including at least one positive lens, is wholly made as a positive-refractive lens group whose convex surface is directed toward the image side. In each of the configuration examples, the fifth lens group GR5 is structured by a cemented lens with two lenses L51, L52. Of those, the lens L51 on the object side is provided positive while the lens L52 on the image side is negative.

The sixth lens group GR6, including at least one positive lens, is wholly made as a positive-refractive lens group whose convex surface is directed toward the image side. In each of the configuration examples, the sixth lens group GR6 is structured by a cemented lens with two lenses L61, L62. Of those, the lens L61 on the object side is provided negative while the lens L62 on the image side is positive.

In the image reading lens of each configuration example, at least all the positive lenses in each lens group satisfy the conditional expression (1), given below. Meanwhile, at least two positive lenses of the first to third lens groups GR1-GR3 and at least two positive lenses of the fourth to sixth lens group GR4-GR6 satisfy the conditional expression (2) given below. Preferably, the lenses constituting the first, second, fifth and sixth lens groups GR1, GR2, GR5, GR6 all satisfy the conditional expression (1). Meanwhile, preferably, all the positive lenses of each lens group satisfy the conditional expression (2).

$$vd > 60.0 \quad (1)$$

$$\Delta\theta_{g,d} > 0.015 \quad (2)$$

Here, vd is Abbe number at the d-line while ng, nd, nF and nC are respective refractive indexes at the g-line, the d-line, the F-line and the C-line. Meanwhile, the relative partial dispersion at the g-line and the d-line is defined as:

$$\theta_{g,d} = (ng - nd)/(nF - nC),$$

and abnormal dispersion at the same is as:

$$\Delta\theta_{g,d} = \theta_{g,d} - 1.365 + 0.00208 \times vd.$$

It is a general practice to consider that where relative partial dispersion $\theta_{g,d}$ and Abbe number vd are plotted as to a plurality of lens materials on a graph coordinate, those deviated greatly in position from the standard lens material are taken as a lens material having abnormal dispersion. Generally, by taking crown glass K7 and flint glass F2 as the standard lens materials and a reference line with a line connecting between the coordinates of the two lens materials, those deviated greatly from the reference line are considered as abnormal-dispersion lens materials.

The image reading lens may have telecentricity on any one of its object and image sides. In the third, fourth and fifth configuration examples of this embodiment, telecentricity is provided on the image side. In the seventh configuration example, telecentricity is provided on the object side. Incidentally, where an imager device whose imaging characteristic is dependent upon angle is used on the image side, the optical system preferably is telecentric on its image side. Meanwhile, where an electronic device such as an LCD whose display characteristic is dependent upon angle is used on the object side, the optical system preferably is telecentric on the object side.

The image reading lens is allowed to mount, on an image or object side, an attachment lens for changing the image magnification of the image reading lens.

FIG. 4B shows an imaging optical system mounted with an attachment lens GR7 on the object side of the fourth configuration example of image reading lens. In the FIG. 4B configuration example, the attachment lens GR7 is structured with a first cemented lens having two lenses L71, L72 and a second cemented lens having two lenses L73, L74. In the FIG. 4B configuration example, image magnification is to be changed toward reducing the image relative to the reference magnification of the image reading lens.

Meanwhile, FIG. 5B shows an imaging optical system mounted with an attachment lens GR7 on the object side of the fifth configuration example of image reading lens. In the FIG. 5B configuration example, the attachment lens GR7 is structured with a cemented lens having two lenses L71, L72. In the FIG. 5B configuration example, image magnification is to be changed toward magnifying the image relative to the reference magnification of the image reading lens.

Meanwhile, FIG. 7B shows an imaging optical system mounted with an attachment lens GR7 on the image side of the seventh configuration example of image reading lens. In the FIG. 7B configuration example, the attachment lens GR7 is structured with only one lens L71. In the FIG. 7B configuration example, image magnification is to be changed toward reducing the image relative to the reference magnification of the image reading lens.

Those configuration examples are each structured telecentric on the side opposite to the side where the attachment lens GR7 is mounted. For example, in the FIG. 4B configuration example, the attachment lens GR7 is arranged on the object side of the image reading lens telecentric on its image side. This suppresses the sensitivity in adjusting the magnification where the attachment lens GR7 is mounted, thus facilitating the adjustment to a desired image magnification.

Where mounting the attachment lens GR7, either one of the spacing between the first lens group GR1 and the second lens group GR2 and the spacing between the fifth lens group GR5 and the sixth lens group GR6 may be changed as compared to the case using the image reading lens singly, in order to suppress the variation of aberrations. Incidentally, balance is available well if changing the spacing by moving the lens group lying on the side opposite to the side where the attachment lens GR7 is mounted. In the FIG. 4B configuration example, the spacing between the fifth lens group GR5 and the sixth lens group GR6 is narrowed by moving the sixth lens group GR6 toward the object side relative to the FIG. 4A reference state. In the FIG. 7B configuration example, the spacing between the first lens group GR1 and the second lens group GR2 is broadened by moving the first lens group GR1 toward the object side relative to the FIG. 7A reference state.

Though detailed examples are not shown, an attachment lens can be mounted on another configuration example of image reading lens because a sufficient space is secured on the image or object side thereof.

Figure 42:
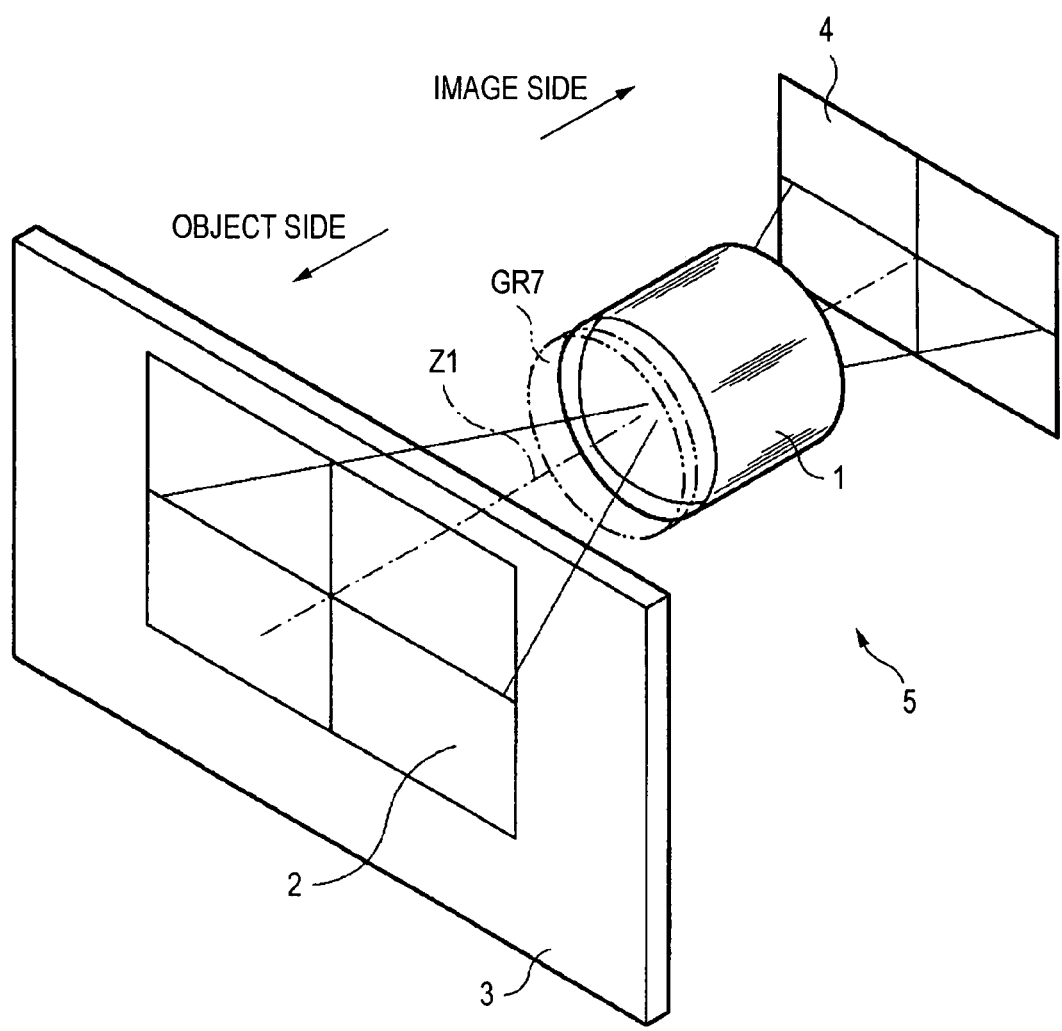
FIG. 42 is a schematic diagram showing a configuration example of an image reader according to an exemplary embodiment of the invention.

FIG. 42 shows a configuration example of an image reader according to an exemplary embodiment of the invention. The image reader has a material rest board 3 on which a material 2, such as a movie film, to read can be mounted, and an imager device 4, such as a CCD, for capturing an image. Between the material 2 and the imager device 4, there is arranged an imaging optical system 5 including an image reading lens 1. An attachment GR7 is to be mounted, as required, to the image reading lens 1 on the image or object side thereof. The material 2 has a surface corresponding to the object plane 10 in FIG. 1, etc. while the imager device 4 has an image surface corresponding to the image plane 20.

The image reader may be any of reflection-upon-material type or transmission-through-material type. In the case of an image reader of reflection-upon-material type, the light of from a not-shown light source is illuminated to the surface of the material 2. The reflection light of from the material 2 is focused on the imager device 4 by means of the imaging optical system 5 and captured as image information by means of the imager device 4.

In the case the image reader is of the transmission-through-original type, the material rest 3 is structured of a transparent material that is transmissive of light. The material 2 is formed transmissive, e.g. a negative film or a positive film. Meanwhile, a light source, not shown, is arranged in back of the material rest board 3 so that light can be illuminated to the material 2 from back of the material rest board 3. The transmission light of from the material 2 is focused on the imager device 4 by the imaging optical system 5 and captured as image information by the imager device 4.

Incidentally, a display device such as an LCD may be arranged as a material 2 on the object side while a movie film or the like be arranged in place of the imager device 4 on the image side. Due to this, the electronic image displayed on the display device can be changed into an optical image by the imaging optical system 5 and then printed onto the movie film or the like.

Now explanation is made on the operation and effect of the image reading lens and imaging optical system thus structured.

In the image reading lens, the first to third lens groups GR1-GR3 are arranged on the object side closer with respect to the aperture stop St while the fourth to sixth lens groups GR4 to GR6 are arranged on the side closer to the image. This provides a lens configuration symmetric about the aperture stop St, thus being advantageous in the imaging characteristic at around ×1 (i.e. approximately ×0.6 to ×1.7). Meanwhile, on the image reading lens, chromatic aberration can be well corrected by fully using binary cemented lenses based on positive and negative lenses in the lens groups. Meanwhile, by fully using the lenses smaller in dispersion to meet the conditional expression (1) and the lenses greater in abnormal dispersion to meet the conditional expression (2), correction can be made with balance simultaneously for aberrations, particularly axial chromatic aberration and lateral color in a visible to infrared region. Out of the range of the conditional expressions (1), (2), chromatic aberration increases while axial chromatic aberration and lateral color are difficult to take with balance.

Meanwhile, where the image reading lens is structured telecentric at any one of object and image sides, shading is prevented from occurring resulting from the dependence upon angle even where using an on-angle-dependent electronic device on the object or image side. Thus, image quality can be maintained well in a center to peripheral region thereof. Meanwhile, the sensitivity of magnification adjustment is suppressed to facilitate the adjustment to a desired image magnification. Incidentally, the configuration not telecentric is advantageous in reducing the size.

Meanwhile, the imaging optical system, whose image reading lens is mounted with an attachment lens GR7, can obtain an image magnification that is different from the reference magnification of the image reading lens used in singly. In this case, where telecentricity is provided on the side opposite to the side where the attachment lens GR7 is mounted, suppressed is the sensitivity of magnification adjustment in mounting the attachment lens GR7, thus facilitating the adjustment to a desired image magnification. Meanwhile, by changing at least one of the spacing between the first lens group GR1 and the second lens group GR2 and the spacing between the fifth lens group GR5 and the sixth lens group GR6 as compared to the case using the image reading lens singly, it is possible to suppress the variation of aberrations caused by mounting the attachment lens GR7 and hence to maintain the imaging characteristic well.

In this manner, the image reading lens or imaging optical system of this embodiment can obtain a well optical characteristic suited for image reading. Due to this, the image reader of this embodiment is allowed to obtain a well read-out image by the provision of the image reading lens or imaging optical system of the embodiment.

Now explanation is made on concrete numerical examples as to the image reading lens and imaging optical system according to the embodiment. A plurality of numerical examples are explained in the following.

In FIG. 9, there is shown as example 1 the concrete lens data corresponding to the FIG. 1 image reading lens configuration. In the column of surface number Si of the FIG. 9 lens data, the surface of the constituent element closest to the object is taken as the first, to show the number of the i-th (i=1 to 18) surface given with a symbol gradually increasing as nearing to the image. In the column of radius of curvature Ri, shown is a value of radius of curvature (mm) of the i-th surface as counted in the closer order to the object correspondingly to the symbol Ri attached in FIG. 1. In the column of surface-to-surface spacing Di, shown is a spacing (mm) on the optical axis between the i-th surface Si and the (i+1)-th surface (Si+1) as similarly counted in the closer order to the object. In the column of Ndj, shown is a values of refractive index at the d-line (wavelength: 587.6 nm) of the j-th (j=1 to 11) lens as counted in the closer order to the object. In the column of vdj, shown is a values of Abbe number at the d-line of the j-th lens as counted in the closer order to the object. In the column of $\theta_{g,d}j$, shown is a values of relative partial dispersion at the g-line and d-line on the j-th lens as counted in the closer order to the object. In the column of $\Delta\theta_{g,d}j$, shown is a values of abnormal dispersion on the j-th lens as counted in the closer order to the object. In the lens data, there is also shown values of the overall focal length f (mm) and image magnification β.

Incidentally, in the numeral column of Abbe number vdj, those emphasized with screening represent that the relevant lens satisfies the numerical range of the conditional expression (1). Likewise, in the numeral column of abnormal dispersion $\Delta\theta_{g,d}j$, those emphasized with screening represent that the relevant lens satisfies the numerical range of the conditional expression (2). In the image reading lens of this embodiment, at least all the positive lenses in each lens group satisfy the conditional expression (1). Meanwhile, all the positive lenses in each lens group satisfy the conditional expression (2).

Likewise the lens data of example 1, in FIG. 10, shown is as example 2 the concrete lens data corresponding to the FIG. 2 image reading lens configuration. In the image reading lens of example 2, at least all the positive lenses in each lens group satisfy the conditional expression (1). Meanwhile, all the positive lenses in each lens group satisfy the conditional expression (2).

In FIG. 11, shown is as example 3 the concrete lens data corresponding to the FIG. 3 image reading lens configuration (wherein i=1 to 19, j=1 ti 12). In the image reading lens of example 3, at least all the positive lenses in each lens group satisfy the conditional expression (1). Particularly, the lenses constituting the first, second, fifth and sixth lens groups GR1, GR2, GR5, GR6 all satisfy the conditional expression (1). Meanwhile, the positive lenses in the first, second, fifth and sixth lens groups GR1, GR2, GR5, GR6 all satisfy the conditional expression (2).

In FIG. 12, shown is as example 4 the concrete lens data corresponding to the FIG. 4A image reading lens configuration (wherein i=1 to 19, j=1 to 12). In the image reading lens of example 4, at least all the positive lenses in each lens group satisfy the conditional expression (1). Meanwhile, the positive lenses in the first, second, fifth and sixth lens groups GR1, GR2, GR5, GR6 all satisfy the conditional expression (2).

In FIG. 13, shown is the concrete lens data corresponding to the FIG. 4B imaging optical system (in a state mounted with an attachment lens) configuration (wherein i=1 to 25, j=1 to 16). In this imaging optical system, image magnification is changed (β=−0.69) toward reducing the image relative to the reference magnification (β=−0.78) of the image reading lens of example 4, by means of the attachment lens GR7 mounted on the object side.

In FIG. 14, shown is as example 5 the concrete lens data corresponding to the FIG. 5A image reading lens configuration (wherein i=1 to 19, j=1 to 12). In the image reading lens of example 4, at least all the positive lenses in each lens group satisfy the conditional expression (1). Particularly, the lenses constituting the first, second, fifth and sixth lens groups GR1, GR2, GR5, GR6 all satisfy the conditional expression (1). Meanwhile, all the positive lenses in each lens group satisfy the conditional expression (2).

In FIG. 15, shown is the concrete lens data corresponding to the FIG. 5B imaging optical system (in a state mounted with an attachment lens) configuration (wherein i=1 to 22, j=1 to 14). In this imaging optical system, image magnification is changed (β=−1.01) toward magnifying the image relative to the reference magnification (β=−0.95) of the image reading lens of example 5, by means of the attachment lens GR7 mounted on the object side.

In FIG. 16 is shown as example 6 the concrete lens data corresponding to the FIG. 6 image reading lens configuration (wherein i=1 to 17, j=1 to 10). In the image reading lens of example 6, at least all the positive lenses in each lens group satisfy the conditional expression (1). Meanwhile, all the positive lenses in each lens group satisfy the conditional expression (2).

In FIG. 17, shown is as example 7 the concrete lens data corresponding to the FIG. 7A image reading lens configuration (wherein i=1-19, j=1-12). In the image reading lens of example 7, at least all the positive lenses in each lens group satisfy the conditional expression (1). Particularly, the lenses constituting the first, second, fifth and sixth lens groups GR1, GR2, GR5, GR6 all satisfy the conditional expression (1). Meanwhile, the positive lenses in the first, second, fifth and sixth lens group GR1, GR2, GR5, GR6 all satisfy the conditional expression (2).

In FIG. 18, shown is the concrete lens data corresponding to the FIG. 7B imaging optical system (in a state mounted with an attachment lens) configuration (wherein i=1 to 21, j=1 to 13). In this imaging optical system, image magnification is changed (β=−0.87) toward reducing the image relative to the reference magnification (β=−0.93) of the image reading lens of example 7, by means of the attachment lens GR7 mounted on the image side.

In FIG. 19, shown is as example 8 the concrete lens data corresponding to the FIG. 8 image reading lens configuration (wherein i=1 to 18, j=1 to 11). In the image reading lens of example 8, at least all the positive lenses in each lens group satisfy the conditional expression (1). Particularly, the lenses constituting the first, second, fifth and sixth lens groups GR1, GR2, GR5, GR6 all satisfy the conditional expression (1). Meanwhile, the positive lenses of the second, third, fourth, fifth and sixth lens groups GR2, GR3, GR4, GR5, GR6 all satisfy the conditional expression (2).

FIGS. 20A to 20D respectively show a spherical aberration, an astigmatism, a distortion and a lateral color, at the image reading lens of example 1. In each of the aberration diagrams, aberration is shown based on the reference wavelength taken at the e-line. In the spherical aberration and lateral color diagrams, aberration is shown also at the g-line (wavelength: 435.8 nm), C-line (wavelength: 656.3 nm) and s-line (wavelength: 852.11 nm). In the astigmatism diagram, the solid line represents an aberration in a sagittal direction while the broken line an aberration in a tangential direction. FNO. represents an F value while h represents an image height. Meanwhile, FIGS. 21A to 21E show a lateral aberration (coma aberration) at each image height, on the image reading lens of example 1. Particularly, FIGS. 21A to 21C show an aberration in the tangential direction while FIGS. 21D and 21E an aberration in the sagittal direction.

Likewise, the aberrations on the image reading lens of example 2 are shown in FIGS. 22A to 22D and 23A to 23E. The aberrations on the image reading lens of example 3 are shown in FIGS. 24A to 24D and 25A to 25E. The aberrations on the image reading lens of example 4 are shown in FIGS. 26A to 26D and 27A to 27E. The aberrations on the image reading lens of example 5 are shown in FIGS. 30A to 30D and 31A to 31E. The aberrations on the image reading lens of example 6 are shown in FIGS. 34A to 34D and 35A to 35E. The aberrations on the image reading lens of example 7 are shown in FIGS. 36A to 36D and 37A to 37E. The aberrations on the image reading lens of example 8 are shown in FIGS. 40A to 40D and 41A to 41E.

Meanwhile, FIGS. 28A to 28D and 29A to 29E similarly show the aberrations on the imaging optical system mounted with the attachment lens GR7 on the image reading lens of example 4. FIGS. 32A to 32D and 33A to 33E similarly show the aberrations on the imaging optical system mounted with the attachment lens GR7 on the image reading lens of example 5. FIGS. 38A to 38D and 39A to 39E similarly show the aberrations on the imaging optical system mounted with the attachment lens GR7 on the image reading lens of example 7. Incidentally, the image reading lens and imaging optical system of example 7 is telecentric at its object side and assumed for the use to print, say, a digital image displayed on an LCD onto a movie film. The aberration at a near-infrared region of light (s-line) is omitted to display.

As can be seen from the numerical-value data and aberration diagrams, aberrations in each example are well corrected, particularly axial chromatic aberration and lateral color are well corrected at the same time. This realizes an image reading lens and imaging optical system suited for use at around ×1 (approximately ×0.6 to ×1.7).

Incidentally, the invention is not limited to the embodiment and examples but can be modified in various ways. For example, the radius of curvature, the surface-to-surface spacing, the refractive index, etc. of the lens component are not limited to the values shown in the numerical examples but can take other values.

Although description has been given heretofore of the invention with reference to the above-mentioned embodiments and examples, the invention is not limited to such embodiments and examples but various modifications are also possible. For example, the values of the radii of curvature, surface intervals and refractive indexes of the respective lens components are not limited to the values that are shown in the above-mentioned numerical examples, but other values can also be used. Also, in the above-mentioned embodiments and examples, the both surfaces of the first to fourth lenses are all formed as aspherical surfaces; however, the invention is not limited to this.

This application claims foreign priority from Japanese Patent Application No. 2006-199077, filed Jul. 21, 2006, the entire disclosure of which is herein incorporated by reference.

What is claimed is:

1. An image reading lens, comprising: in order from an object side thereof,
    a first lens group including at least one positive lens, wholly having a positive refractive power, and having a convex surface on the object side thereof;
    a second lens group including at least one positive lens, wholly having a positive refractive power, and a convex surface on the object side thereof;
    a third lens group of a cemented lens including a positive lens and a negative lens, the third lens group wholly having a negative refractive power and having a convex surface on the object side thereof;
    an aperture stop;
    a fourth lens group of a cemented lens including a positive lens and a negative lens, the fourth lens group wholly having a negative refractive power and having a convex surface on an image side thereof;
    a fifth lens group including at least one positive lens, wholly having a positive refractive power, and having a convex surface on the image side thereof; and
    a sixth lens group including at least one positive lens, wholly having a positive refractive power, and having a convex surface on the image side thereof;
    wherein
    at least all positive lenses in each of the first to sixth lens groups satisfy conditional expression (1), and
    at least two positive lenses of the first to third lens groups and at least two positive lenses of the fourth to sixth lens groups satisfy conditional expression (2):

$$vd > 60.0 \quad (1)$$

$$\Delta\theta_{g,d} > 0.015 \quad (2)$$

wherein Abbe number at the d-line is vd; refractive indexes at the g-line, the d-line, the F-line and the C-line are ng, nd, nF and nC, respectively; relative partial dispersion at the g-line and the d-line is $\theta_{g,d} = (ng-nd)/(nF-nC)$; and abnormal dispersion is $\Delta\theta_{g,d} = \theta_{g,d} - 1.365 + 0.00208 \times vd$.

2. The image reading lens according to claim 1, wherein all lenses in the first, second, fifth and sixth lens groups satisfy the conditional expression (1).

3. The image reading lens according to claim 1, wherein all positive lenses in each of the first to sixth lens groups satisfy the conditional expression (2).

4. The image reading lens according to claim 1, which has telecentricity on one of the object and image sides thereof.

5. The image reading lens according to claim 1, wherein
    the first lens group is a cemented lens, the cemented lens consisting of a positive lens and a negative lens, wholly having a positive refractive power, and having a convex surface on the object side thereof;
    the second lens group is a cemented lens, the cemented lens consisting of a positive lens and a negative lens, wholly having a positive refractive power, and having a convex surface on the object side thereof;
    the fifth lens group is a cemented lens, the cemented lens consisting of a positive lens and a negative lens, wholly having a positive refractive power, and having a convex surface on the image side thereof; and
    the sixth lens group is a cemented lens, the cemented lens consisting of a positive lens and a negative lens, wholly having a positive refractive power, and having a convex surface on the image side thereof.

6. An imaging optical system comprising:
    an image reading lens according to claim 1; and
    an attachment lens mounted on one of the image and object sides of the image reading lens, the attachment lens changing an image magnification of the image reading lens.

7. The image reading lens according to claim 2, wherein all positive lenses in each of the first to sixth lens groups satisfy the conditional expression (2).

8. The image reading lens according to claim 2, which has telecentricity on one of the object and image sides thereof.

9. The image reading lens according to claim 2, wherein
    the first lens group is a cemented lens, the cemented lens consisting of a positive lens and a negative lens, wholly having a positive refractive power, and having a convex surface on the object side thereof;
    the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

10. The image reading lens according to claim 3, which has telecentricity on one of the object and image sides thereof.

11. The image reading lens according to claim 3, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof, and the sixth lens group is a cemented lens, the cemented lens consisting of a positive lens and a negative lens, wholly having a positive refractive power, and having a convex surface on the image side thereof.

12. The image reading lens according to claim 4, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

13. The image reading lens according to claim 7, which has telecentricity on one of the object and image sides thereof.

14. The image reading lens according to claim 7, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

15. The image reading lens according to claim 8, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

16. The image reading lens according to claim 10, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

17. The image reading lens according to claim 13, wherein the first lens group is a cemented lens, the cemented lens consisting of a positive lens and a negative lens, wholly having a positive refractive power, and having a convex surface on the object side thereof;

the second lens group is a cemented lens, the cemented lens consisting of a positive lens and a negative lens, wholly having a positive refractive power, and having a convex surface on the object side thereof;

the fifth lens group is a cemented lens, the cemented lens consisting of a positive lens and a negative lens, wholly having a positive refractive power, and having a convex surface on the image side thereof; and the sixth lens group is a cemented lens, the cemented lens consisting of a positive lens and a negative lens, wholly having a positive refractive power, and having a convex surface on the image side thereof.

18. The imaging optical system according to claim 6, wherein one of a spacing between the first lens group and the second lens group and a spacing between the fifth lens group and the sixth lens group is changed as compared to a case where the image reading lens is singly used.

19. An imaging optical system comprising:
an image reading lens according to claim 2; and
an attachment lens mounted on one of the image and object sides of the image reading lens, the attachment lens changing an image magnification of the image reading lens.

20. The imaging optical system according to claim 19, wherein one of a spacing between the first lens group and the second lens group and a spacing between the fifth lens group and the sixth lens group is changed as compared to a case where the image reading lens is singly used.

21. An image reader comprising an image reading lens according to claim 1.

* * * * *